(12) United States Patent
Ohmoto

(10) Patent No.: US 9,290,673 B2
(45) Date of Patent: Mar. 22, 2016

(54) IMAGE FORMING METHOD AND IMAGE RECORDED MATERIAL

(71) Applicant: FUJIFILM CORPORATION, Tokyo (JP)

(72) Inventor: Makoto Ohmoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 489 days.

(21) Appl. No.: 13/736,755

(22) Filed: Jan. 8, 2013

(65) Prior Publication Data

US 2013/0187998 A1    Jul. 25, 2013
US 2016/0017160 A2    Jan. 21, 2016

(30) Foreign Application Priority Data

Jan. 20, 2012  (JP) ................................. 2012-010511
Nov. 6, 2012   (JP) ................................. 2012-244424

(51) Int. Cl.
   *C09D 11/38*   (2014.01)
   *C09D 11/322*  (2014.01)

(52) U.S. Cl.
   CPC .............. *C09D 11/38* (2013.01); *C09D 11/322* (2013.01); *Y10T 428/24893* (2015.01)

(58) Field of Classification Search
   CPC ................. C09D 11/38; C09D 11/322; Y10T 428/24893
   See application file for complete search history.

(56) References Cited

U.S. PATENT DOCUMENTS

| 5,345,254 | A  | * | 9/1994  | Wong et al. ............... 347/100 |
| 5,674,923 | A  |   | 10/1997 | Subbaraman et al. |
| 7,651,211 | B2 |   | 1/2010  | Mori |
| 8,093,311 | B2 |   | 1/2012  | Noguchi et al. |
| 8,216,666 | B2 |   | 7/2012  | Warner et al. |
| 2003/0219539 | A1 | * | 11/2003 | Nigam ........................ 427/372.2 |
| 2005/0004263 | A1 | * | 1/2005  | Gould et al. .................. 523/160 |
| 2006/0205839 | A1 |   | 9/2006  | Noguchi et al. |
| 2009/0162569 | A1 |   | 6/2009  | Morohoshi et al. |
| 2009/0220751 | A1 |   | 9/2009  | Warner et al. |
| 2010/0086692 | A1 |   | 4/2010  | Ohta |
| 2010/0143593 | A1 |   | 6/2010  | Sano |
| 2011/0234682 | A1 |   | 9/2011  | Ohta et al. |

(Continued)

FOREIGN PATENT DOCUMENTS

| JP | 2005-126729 A | 5/2005 |
| JP | 2006-249203 A | 9/2006 |
| JP | 2009-172971 A | 8/2009 |

(Continued)

OTHER PUBLICATIONS

The extended European Search Report dated Apr. 25, 2013, which corresponds to EP Application No. 12197437.2-1302 and is related to U.S. Appl. No. 13/736,755.

(Continued)

*Primary Examiner* — Betelhem Shewareged
(74) *Attorney, Agent, or Firm* — Studebaker & Brackett PC

(57) ABSTRACT

Provided is an image forming method capable of obtaining an image which has superior adhesion with a recording substrate having ink non-absorbency or low ink-absorbency and has superior scratch resistance.

The ink forming method includes an ink application step of applying a water-based ink containing polymer particles, an amine compound having at least one hydroxyl group, a colorant, and water, onto a recording substrate having ink non-absorbency or low ink-absorbency.

11 Claims, 2 Drawing Sheets

(56) References Cited

U.S. PATENT DOCUMENTS

| | | |
|---|---|---|
| 2012/0218342 A1 | 8/2012 | Ikeda et al. |
| 2013/0053485 A1 | 2/2013 | Misawa et al. |

FOREIGN PATENT DOCUMENTS

| | | | |
|---|---|---|---|
| JP | 2009-249446 A | 10/2009 | |
| JP | 2009-291976 A | 12/2009 | |
| JP | 2010-037700 A | 2/2010 | |
| JP | 2010-090266 A | 4/2010 | |
| JP | 2010-105187 A | 5/2010 | |
| JP | 2010-194998 A | 9/2010 | |
| JP | 2010-270322 A | 12/2010 | |
| JP | 2011-062946 A | 3/2011 | |
| JP | 2011-513049 A | 4/2011 | |
| JP | 2011-195766 A | 10/2011 | |
| JP | 2011-245670 A | 12/2011 | |
| WO | 2011/055595 A1 | 5/2011 | |
| WO | 2011/093486 A1 | 8/2011 | |

OTHER PUBLICATIONS

An Office Action; "Notice of Reasons for Rejection," issued by the Japanese Patent Office on Dec. 17, 2013, which corresponds to Japanese Patent Application No. 2012-244424 and is related to U.S. Appl. No. 13/736,766; with English language translation.

* cited by examiner

IMAGE FORMING METHOD AND IMAGE RECORDED MATERIAL

BACKGROUND

1. Technical Field

The present invention relates to an image forming method and an image recorded material.

2. Description of the Related Art

Recently, various methods have been widely used as an image forming method. No matter which method is used, it is required to obtain a high-quality image. Among these methods, as an image forming method using an ink jet method, a method of discharging ink droplets from multiple nozzles, which are provided in an ink jet head, to form an image is known. This method is widely used because high-quality images can be formed on various recording media at high speed.

A pigment is widely used as a colorant, which is one of components included in an ink material. Usually, a pigment is dispersed in a medium such as water to be used. When a pigment is dispersed to be used, the size of dispersed particles, stability after the dispersion, size uniformity, a discharge property from a discharge head, image density, and the like are important properties, and techniques for improving these properties have been examined in various ways.

Meanwhile, when an image is formed with an ink jet method, the durability of the formed image is one of the important properties from the viewpoint of quality.

It is attempted to improve scratch resistance which is one of the properties indicating the durability of an image. For example, in order to strengthen an ink film, an ink for ink jet recording containing an aqueous resin emulsion is disclosed (for example, refer to JP2006-249203A). Furthermore, in order to enhance the smoothness of an image and improve scratch resistance in terms of appearance, techniques of using wax particles are known. For example, a printing method is attempted in which a resin ink containing resin particles and wax particles is used in combination with a color ink to perform ink jet recording on a recording medium having ink non-absorbency or low ink-absorbency (for example, refer to JP2010-105187A). In this method, image quality and scratch resistance are superior irrespective of the ink-absorbency of a recording medium.

Meanwhile, in order to improve adhesion with ink, techniques of pretreating a substrate are widely known. For example, an example of performing a surface treatment such as a corona treatment on a non-woven fibrous web is disclosed (for example, refer to JP2011-513049A). However, when the surface treatment such as a corona treatment is performed, there are many cases where the quality of an image recorded material deteriorates, for example, a surface of a substrate is roughened considerably.

In addition, from the viewpoints of an ejecting property, glossiness, and maintainability of ink, a water-based ink for ink jet recording containing a pigment, a resin, and a water-soluble alkanolamine is disclosed (for example, refer to JP2010-270322A). Furthermore, in order to maintain moisture and prevent clogging, an ink composition using triethanolamine (for example, refer to JP2005-126729A) and an ink set for ink jet recording using trialkanolamine as a gloss agent (for example, refer to JP2009-172971A) are disclosed.

SUMMARY

When a resin sheet, such as polypropylene, having ink non-absorbency or low ink-absorbency; or non-woven fabric using a synthetic fiber (resin fiber), such as polypropylene, having ink non-absorbency or low ink-absorbency is used as a recording substrate to form an ink image thereon, such a resin sheet or synthetic fiber does not absorb ink. Therefore, it is difficult for ink to be fixed onto the recording substrate. Therefore, image quality easily deteriorates, for example, an image is peeled off or is separated by being scratched or rubbed, or the scratch resistance of an image is low.

Among the above-described techniques of the related art, when the ink for ink jet recording containing an aqueous resin emulsion is used, an image containing polymer particles is formed. However, when an image is formed on the above-described recording substrate (such as a nonwoven fabric) having ink non-absorbency or low ink-absorbency using the ink for ink jet recording containing an aqueous resin emulsion, image quality may be unsatisfactory from the viewpoint of scratch resistance. It is known that the above-described recording substrate generally has low adhesion with ink. The simple addition of polymer particles and wax particles to ink does not ensure to obtain an image having sufficient scratch resistance.

In addition, a composition containing triethanolamine is also known as an example of an ink. However, among examples of a water-based ink containing polymer particles, there are no examples which focus on scratch resistance and adhesion of an image when an image is formed on the above-described resin sheet or non-woven fabric having ink non-absorbency or low ink-absorbency which has extremely low adhesion with the water-based ink.

The present invention has been made in consideration of the above-described circumstances, and an object thereof is to provide an image forming method in which an image, which has superior adhesion with a recording substrate (for example, a resin sheet or non-woven fabric formed from a resin fiber) having ink non-absorbency or low ink-absorbency and superior scratch resistance, can be formed; and an image recorded material on which an image having superior scratch resistance and superior adhesion with the recording substrate is formed.

When a resin sheet, such as polypropylene, having ink non-absorbency or low ink-absorbency, non-woven fabric using fiber, such as polypropylene, having ink non-absorbency or low ink-absorbency, or the like is used as a recording substrate to form an image thereon, such a substrate has not only lower ink absorbency but lower adhesion with an image than those of plain paper or ink jet paper which is generally used for forming an image. The present inventors found that, when a composition containing polymer particles and an amine compound having both an amine structure and a hydroxyl group in an ink used for forming an image on such a recording substrate, is used, the adhesion of an image to the recording substrate is significantly improved as compared to a combination of an ink and a recording substrate in the related art. The claimed inventions have been made based on this finding.

Specific means for achieving the object is as follows.

<1> An image forming method comprises an ink application step of applying a water-based ink containing polymer particles, an amine compound having at least one hydroxyl group, a colorant, and water, onto a recording substrate having ink non-absorbency or low ink-absorbency.

<2> In the image forming method according to <1> above, during the application, the water-based ink is applied onto the recording substrate with an ink jet method with an amount of ink droplets of 60 pl to 120 pl.

<3> In the image forming method according to <1> or <2> above, the amine compound is a compound represented by the following formula (1).

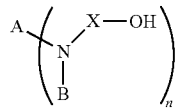

Formula (1)

In the formula (1), X represents an alkylene group having 1 to 10 carbon atoms or an alkyleneoxy alkylene group having 1 to 10 carbon atoms; n represents 1 or 2; when n=1, A and B each independently represent a hydrogen atom or an alkyl group (in particular, it is preferable that A and B each independently represent a hydroxyalkyl group) and B and A or B and X may be bonded and linked to each other; and when n=2, A represents an alkylene group or an alkylamine group, B represents a hydrogen atom or an alkyl group, and B and X may be bonded and linked to each other.

<4> In the image forming method according to any one of <1> to <3> above, the number of hydroxyl groups in the amine compound is 1 to 10.

<5> In the image forming method according to any one of <1> to <4> above, the water-based ink further contains wax particles.

<6> In the image forming method according to any one of <1> to <5> above, the polymer particles are particles containing polyurethane.

<7> In the image forming method according to any one of <1> to <6> above, the colorant is a pigment, and the water-based ink further contains a dispersant which disperses the pigment.

<8> In the image forming method according to any one of <1> to <7> above, the recording substrate is an aggregate of fiber materials having ink non-absorbency or low ink-absorbency.

<9> In the image forming method according to <8> above, the fiber materials are polymer fibers.

<10> The image forming method according to any one of <1> to <9> above, further comprises a drying and fixing step of drying the water-based ink being applied in the ink application step to fix the water-based ink on the recording substrate.

<11> An image recorded material comprises a recording substrate having ink non-absorbency or low ink-absorbency, and an ink image which is formed on the recording substrate and contains a polymer, an amine compound having at least one hydroxyl group, and a colorant.

According to the present disclosure, an image forming method can be provided in which an image, which has superior adhesion with a recording substrate (for example, a resin sheet or non-woven fabric formed from a resin fiber) having ink non-absorbency or low ink-absorbency and superior scratch resistance, can be formed. In addition, according to the present disclosure, an image recorded material can be provided on which an image having superior scratch resistance and superior adhesion with the recording substrate is formed.

DESCRIPTION OF THE PREFERRED EMBODIMENTS

Figure 1:
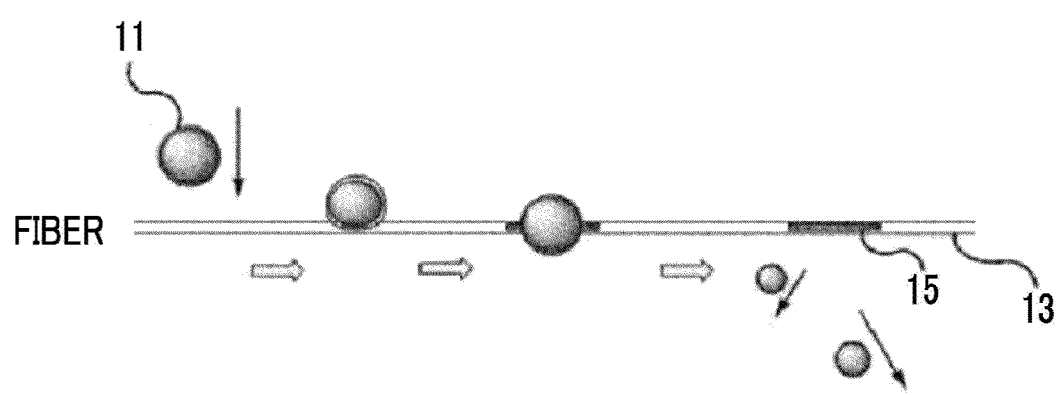
FIG. 1 is a diagram conceptually illustrating a state where, when a water-based ink is applied onto non-woven fabric (recording substrate), the ink is spread out and attached on the fiber.

Hereinafter, an image forming method according to an embodiment and an image recorded material which is obtained with the image forming method will be described in detail.

Image Forming Method

The image forming method according to the embodiment includes an ink application step of applying a water-based ink containing polymer particles, an amine compound having at least one hydroxyl group, a colorant, and water, onto a recording substrate having ink non-absorbency or low ink-absorbency. In addition, it is preferable that the image forming method according to the embodiment further include a drying and fixing step of drying the water-based ink, applied in the ink application step, to fix the water-based ink on the recording substrate. The image forming method may further include other steps as necessary.

In the embodiment, a sheet material or film material having ink non-absorbency or low ink-absorbency (for example, a sheet material or film material such as polypropylene or polyethylene); or non-woven fabric formed from fiber (for example, a resin fiber such as polypropylene or polyethylene) having ink non-absorbency or low ink-absorbency is used as a recording substrate instead of recording paper (for example, plain paper, ink jet paper, or coated paper) which is generally used for ink jet recording and is mainly composed of pulp. When an image is formed on such a recording substrate, the ink to be applied contains polymer particles and an amine compound having an amine structure and a hydroxyl group (OH group). As a result, the scratch resistance of an image, which is significantly lower than that of an image formed on plain paper or the like, is further improved as compared to a combination of an ink and a recording substrate in the related art. Furthermore, adhesion with a recording substrate having ink non-absorbency or low ink-absorbency which generally has low adhesion with a water-based ink, is further improved. Such scratch resistance and adhesion appear more remarkable, in particular, with a relatively large amount of ink droplets of 60 pl or larger.

A composition which contains a compound (for example, glycerin) having a hydroxyl group without an amine structure is known in the related art. In addition, in a compound not having both an amine structure and a hydroxyl group, the same effects as those of the embodiment cannot be expected and furthermore adhesion and scratch resistance deteriorate. From this point of view, the composition which selectively contains the polymer particles and the amine compound having both an amine structure and a hydroxyl group may be effective for use in forming an image on a recording substrate having ink non-absorbency or low ink-absorbency.

In addition, according to the embodiment, the texture of an image (for example, low smoothness and stickiness of an image) such as touch can also be improved, which is efficient for forming a high-quality image.

Ink Application Step

In the ink application step according to the embodiment, a water-based ink containing polymer particles, an amine compound having at least one hydroxyl group, a colorant, and water, is applied onto a recording substrate having ink non-absorbency or low ink-absorbency. The water-based ink is applied by selecting one of the arbitrary methods of applying ink onto a recording substrate to form an image. Among these, an ink jet method is preferable in that a plate is not necessary and cost is suppressed even when the printing is small lot printing and in that printing can be performed on a fiber recording substrate having an uneven surface. The water-based ink according to the embodiment will be described below in detail.

An applying water-based ink can be preferably performed onto a recording substrate with the ink jet method. When the ink jet method is used, the ink is selectively applied onto desirable regions.

The ink jet method is not particularly limited, and any one of a charge control method of using electrostatic attraction force to discharge ink; a drop-on-demand method (pressure pulse method) of using a vibration pressure of a piezoelectric element; an acoustic ink jet method of converting electric signals into acoustic beams (radiation pressure) to discharge ink; and a thermal ink jet (BUBBLE JET (trade name)) method of heating ink to form bubbles and using a generated pressure thereof may be used.

When the ink is applied onto the recording substrate with the ink jet method, a 1-pass or multi-pass recording can be used as the application method, but 1-pass or 2-pass recording is preferable from the viewpoint of high-speed recording. The 1-pass recording described herein is a recording method in which ink is discharged once to form and record all the dots (ink droplets) which should be formed in a scanning region in a direction intersecting a transport direction of a recording substrate (in a direction in which recording elements are arranged). In this case, a discharge head (line head in which recording elements are arranged) having a length corresponding to a width of a substrate is provided in a width direction of the substrate intersecting a transport direction in which the recording substrate is transported during recording. Ink is discharged from multiple discharge holes, which are provided in the discharge head, at the same time in a main scanning direction. This method is referred to as a so-called line method. An image is formed on the entire surface of a recording substrate by scanning the recording substrate in a direction (main scanning direction) intersecting an arrangement direction of recording elements. In this method, a transport system such as a carriage, which is required in a shuttle method of forming an image while scanning a short serial head in a width direction (main scanning direction) of a recording substrate, is unnecessary. In addition, 2-pass recording is a recording method in which ink is discharged twice to form dots which should be formed in a scanning region.

The amount of the ink droplets to be applied onto a recording substrate is not particularly limited as long as it falls within a range that can satisfy the texture of an image portion according to the required scratch resistance and adhesion and the necessity. A given amount of ink droplets may be selected from the viewpoints of the kind of an image, the kind of a recording substrate, image density, and the like.

In the embodiment, the amount of the ink droplets is preferably 60 pl to 120 pl from the viewpoints of more efficiently increasing the scratch resistance and adhesion of an image, which is formed on a recording substrate having ink non-absorbency or low ink-absorbency. For the same reason, the amount of the ink droplets is more preferably 70 pl to 110 pl and still more preferably 70 pl to 100 pl. When the amount of the ink droplets is greater than or equal to 60 pl, an ink region is secured after fixing and is difficult to peel, the adhesion of an image to a substrate is improved, and the scratch resistance is also improved. In addition, when the amount of the ink droplets is less than or equal to 120 pl, a dried state of ink droplets on a surface of a substrate can be satisfactorily maintained and image bleeding is prevented.

In addition, the diameter of the ink droplets to be applied onto a recording substrate (diameter before being applied) is preferably 48 μm to 61 μm and more preferably 51 μm to 59 μm. In addition, the diameter of the ink droplets can be measured by directly observing the ink droplets using a high-speed camera (for example, a Hyper Vision HPV-2A manufactured by Shimadzu Corporation).

The viscosity (at 30° C.) of the water-based ink is preferably 4 mPa·s to 20 mPa·s and more preferably 6 mPa·s to 16 mPa·s from the viewpoint of stably supplying the ink from an ink tank to a recording head.

For example, the resolution for each color is preferably greater than or equal to 100 dpi (dot per inch), and the ink viscosity is preferably 4 to 20 mPa·s (at 30° C.). The resolution is preferably greater than or equal to 200 dpi from the viewpoint of high image quality.

In the embodiment, the water-based ink is used from the viewpoints of not impairing the global environment and the work environment during image recording. Generally, a water-based ink has low absorbency for a sheet material or film material having ink non-absorbency or low ink-absorbency or non-woven fabric formed from fiber having ink non-absorbency or low ink-absorbency; and thus has low adhesion with such recording substrates. Therefore, the water-based ink according to the embodiment contains, as described above, polymer particles and an amine compound having both an amine structure and a hydroxyl group. As a result, an image having superior scratch resistance and adhesion is obtained.

Figure 2:
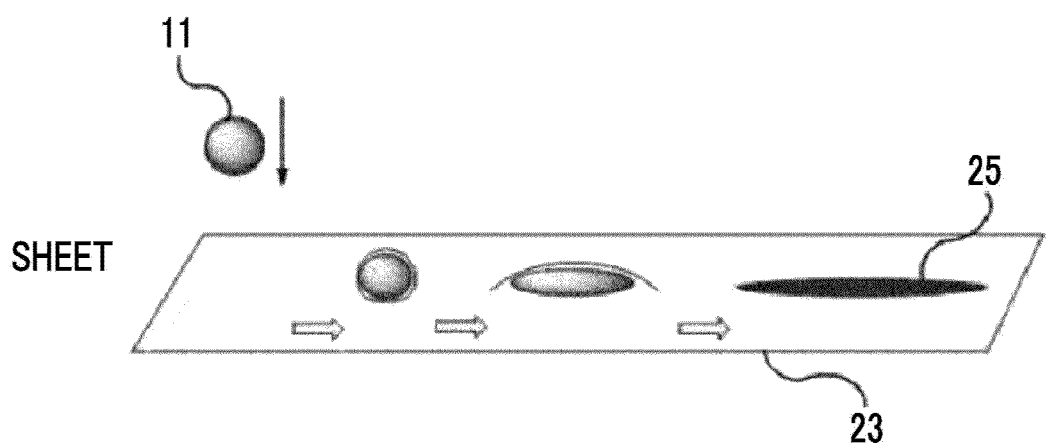
FIG. 2 is a diagram conceptually illustrating a state where, when a water-based ink is applied onto a sheet (recording substrate), the ink is spread out thereon.

As an example, an image forming property of a case where ink is discharged onto non-woven fabric with an ink jet method to form an image will be described in comparison to the case of a sheet of paper. When ink is applied onto non-woven fabric, which is an aggregate of fibers such as polypropylene, as illustrated in FIG. 1, a part of ink droplets 11 applied onto non-woven fabric 13 is attached and remains on a surface of the fiber to form a colored portion, but the other part of the ink droplets 11, which has failed to be attached and remains thereon, is separated and further permeates the material due to low ink-absorbency of the fabric which forms the non-woven fabric. On the other hand, when ink is applied onto a sheet of paper (for example, plain paper) which is widely used in general for ink jet recording, as illustrated in FIG. 2, ink droplets 11 applied onto a surface of a sheet 23 permeates voids in the sheet to form a colored portion 25 while being spread out on the sheet 23 not only in a thickness direction thereof but in a surface direction thereof, due to ink absorbency of a material such as pulp which forms the sheet. As a result, the ink droplets 11 are easily fixed. That is, non-woven fabric has a surface of fiber having low ink-absorbency which does not absorb a water-based ink as illustrated in FIG. 1, and thus has a tendency that ink droplets are not easily fixed onto applied portions thereof unless they work on the surface of fiber. According to the embodiment, the ink contains polymer particles and an amine compound having both an amine structure and a hydroxyl group to form bridges between the polymer particles and a recording substrate such as polypropylene, which contributes to adhesion between the polymer particles in the ink and the recording substrate. As a result, the scratch resistance of an image is improved.

Water-Based Ink

The water-based ink according to the embodiment has a composition containing polymer particles, an amine compound having at least one hydroxyl group, a colorant, and water. In the water-based ink according to the embodiment, components such as a dispersant for a pigment, wax, an organic solvent, a surfactant, and other additives can be further used.

Polymer Particles

The water-based ink according to the embodiment contains at least one kind of polymer particles. When the water-based ink contains the polymer particles, the adhesion of an image with a recording substrate and the scratch resistance can be improved.

Examples of the polymer particles include particles of thermoplastic, thermosetting, or modified resins such as acrylic resins, epoxy resins, polyurethane resins, polyolefin resins, polyether resins, polyamide resins, unsaturated polyester resins, phenol resins, silicone resins, fluororesins, polyvinyl resins (for example, vinyl chloride, vinyl acetate, polyvinyl alcohol, and polyvinyl butyral), alkyd resins, polyester resins (for example, phthalic acid resin), amino resins (for example, melamine resin, melamine formaldehyde resin, amino alkyd condensation resin, and urea resin), and copolymers and mixtures thereof.

As the polymer particles, one kind may be used alone, or two or more kinds may be used in combination. In addition, polymer particles obtained by mixing two or more kinds of polymers with each other or polymer particles obtained by bonding two or more kinds of monomers to each other may be used.

Among these, as the polymer particles, acrylic resins, polyurethane resins, polyether resins, polyester resins, and polyolefin resins are preferable, and polyurethane resins and acrylic resins are more preferable. Among these, polyurethane resins are particularly preferable from the following viewpoints.

The reasons why polyurethane resins are preferable are considered to be as follows.

Polyurethane resins are formed from urethane units which can have a strong interaction, such as hydrogen bonds, between polymers, and non-urethane units which can have a relatively weak interaction between polymers. It is considered that when an ink film is formed, the units having a strong interaction and the units having a relatively weak interaction aggregate respectively as a microstructure to form a sea-island structure; and therefore polyurethane has flexibility. Polyurethane essentially has such flexibility and thus can be used as polymer particles having a high Tg. Therefore, it is considered that an ink film (ink image) having superior flexibility, strength, and scratch resistance can be formed as compared to a case where polymer particles having a low Tg, which are known in the related art, are used.

Therefore, polyurethane resins are advantageous even when "a recording substrate which is an aggregate of fibers having ink non-absorbency or low ink-absorbency" in which scratch resistance, in particular, is difficult to obtain is used.

In addition, polyurethane resin particles are preferable from the viewpoint of further improving the continuous discharge property and discharge stability of the water-based ink. Polyurethane resins have a smaller amount of deterioration caused by photolysis than that of acrylic polymers. An image formed using the water-based ink containing a polyurethane resin has superior light resistance.

As the polyurethane resin particles, particles containing at least one kind of resins represented by the following formulae UP-1 to UP-4 are preferable.

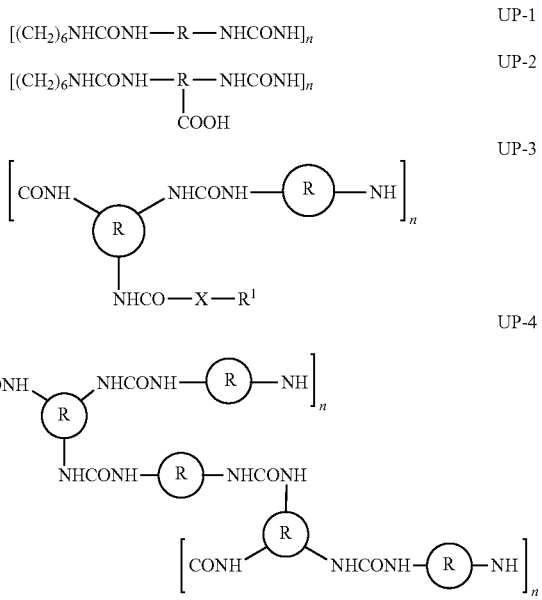

In the formulae UP-1 to UP-4, R represents an aliphatic group or an aromatic group; $R^1$ represents —$(CH_2)_m$—COOH or —$(CH_2CH_2O)_p$—$CH_3$, m represents an integer of 1 to 10; p represents an integer of 1 to 100; X represents NH or O; and n represents an arbitrary positive integer.

It is preferable that the polyurethane resins represented by the formulae UP-1 to UP-4 have a cross-linked bond. By doing so, the shear stability of the polyurethane resin particles is improved. In addition, it is preferable that the polyurethane resins represented by the formulae UP-1 to UP-4 have an acidic group from the viewpoint of improving the dispersion stability of the polyurethane resin particles.

A method of preparing the polyurethane resins represented by the formulae UP-1 to UP-4 and the preferable forms thereof is not particularly limited. For example, a preparation method disclosed in JP2006-241457A is preferable. That is, in this method, an emulsion containing an isocyanate compound and an anionic surfactant is prepared, a bifunctional, trifunctional, or polyfunctional reactant is added thereto, followed by stirring. As a result, a polyurethane resin is prepared.

In addition, it is particularly preferable that the polymer particles according to the embodiment be polyurethane particles having a structure represented by the following formula (PU-1)

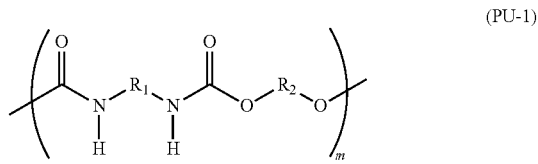

In the formula, $R_1$ represents an aliphatic resin or an aromatic resin; and $R_2$ represents a residue of a diol compound. It is preferable that the residue be a group selected from an alkylene group, a polyether group, a polyester group, a polycarbonate group, and a polycaprolactone group.

Examples of the aliphatic group represented by $R_1$ include divalent groups derived from isophorone diisocyanate (IPDI), hydrogenated m-xylene diisocyanate (H6XDI), hydrogenated diphenyl methane diisocyanate (H12MDI), and hexamethylene diisocyanate (HDI).

Examples of the aromatic group represented by $R_1$ include divalent groups derived from m-xylene diisocyanate (XDI), tolylene diisocyanate (TDI), and diphenyl methane diisocyanate (MDI). Among these, it is more preferable that $R_1$ represent an aliphatic group from the viewpoint of the durability of an image. It is considered that, by selecting a relatively flexible structure, the flexibility of an ink film after the ink is fixed onto a recording substrate is improved and thus the durability of an image increases. $R_2$ represents a residue of a diol compound. The residue is preferably a group selected from an alkylene group, a polyether group, a polyester group, a polycarbonate group, and a polycaprolactone group, more preferably a group selected from an alkylene group, a polyether group, a polyester group, and a polycarbonate group, and still more preferably a group selected from an alkylene group having 1 to 30 carbon atoms, an alkyl ether group having 2 to 60 carbon atoms, and an alkyl ester group having 1 to 30 carbon atoms. The reason is considered that, by selecting a relatively flexible structure, the flexibility of an ink film after the ink is fixed onto a recording substrate is improved and thus the durability of an image increases.

In addition, m represents an integer and may be appropriately selected in a range that satisfies the following molecular weight.

The polymer particles may have a cross-linked structure or not, and it is more preferable that the polymer particles do not have a cross-linked structure from the viewpoint of an image fixing property.

As the polyurethane resin particles, commercially available products may be used. Examples of the commercially available products include ACRIT WBR-016U (Tg: 20° C.), WEM-321U (Tg: 20° C.), WBR-2018 (Tg: 20° C.), WBR-2000U (Tg: 45° C.), and WBR-601U (Tg: −30° C.) (all of which are manufactured by Taisei Fine Chemical Co., Ltd.); PUE-1000, PUE-1020A, PUE-1370, and PUE-800 (all of which are manufactured by Murayama Chemical Laboratory Co., Ltd.); SUPERFLEX 650, 860, and 210 (all of which manufactured by Dai-ichi Kogyo Seiyaku Co., Ltd.); NEO-TAN UE-1100 (manufactured by Toagosei Co., Ltd.); UCOAT UX-150 and UWS-145, PERMARINE UA-150 (Tg: 36° C.) and UA-368, and UPRENE UXA-307 (all of which are manufactured by Sanyo Chemical Industries Ltd.); IMPRANIL DLP-R (Tg: 21° C.), DLN (Tg: −55° C.), and DLC-F (Tg: −42° C.), BAYHYDROL (UH XP2648; Tg: −51° C.), and DISPERCOLL U-53 (Tg: −58° C.) (all of which are manufactured by Sumitomo Beyer urethane Co., Ltd.); and UW-1005-E (Tg: −30° C.) and UW-5101-E (Tg: 69° C.) (all of which are manufactured by Ube Industries Ltd.).

In the embodiment, resins other than the polyurethane resins may be used. Examples of such resins include JON-CRYL 741 (Tg: 15° C.; styrene/acrylic resin), 775 (Tg: 37° C.; styrene/acrylic resin), 537 (Tg: 49° C.; styrene/acrylic resin), and 538 (Tg: 66° C.; styrene/acrylic resin) (all of which are manufactured by Johnson Polymer Ltd.); ARON HD-5 (Tg: 45° C.; acrylic resin; manufactured by Toagosei Co., Ltd.); and MOWINYL 742N (Tg: 37° C.; acrylic resin; manufactured by Nippon Synthetic Chemical Industry Co., Ltd.).

The content of the polyurethane resin in the ink composition according to the embodiment is preferably 0.1% by mass to 20% by mass, more preferably 1% by mass to 15% by mass, and still more preferably 2% by mass to 10% by mass. When the content of the polyurethane resin is less than or equal to 20% by mass, a discharge property can be satisfactorily maintained, and when the content of the polyurethane resin is greater than or equal to 0.1% by mass, the durability of an image is superior.

In addition, it is preferable that the acrylic resin have an anionic group. For example, such an acrylic resin is obtained by polymerizing acrylic monomers having an anionic group (anionic group-containing acrylic monomers) and optionally other monomers, which are copolymerizable with the anionic group-containing acrylic monomers, in a solvent. Examples of the anionic group-containing monomers include acrylic monomers having one or more groups selected from a carboxylic group, a sulfo group, and a phosphono group. Among these, acrylic monomers having a carboxylic group (for example, acrylic acid, methacrylic acid, crotonic acid, ethacrylic acid, propyl acrylic acid, isopropyl acrylic acid, itaconic acid, and fumaric acid) are preferable, and acrylic acid or methacrylic acid is more preferable.

Particles of a self-dispersible polymer having self-dispersibility are preferable as the polymer particles. Hereinafter, the particles of the self-dispersible polymer will be described.

The particles of the self-dispersible polymer represent particles of a water-insoluble polymer which does not contain a free emulsifier and can be dispersed in an aqueous medium by a functional group (in particular, an acidic group or a salt thereof) included in the polymer when the dispersion is performed in the absence of a surfactant (in particular, when the dispersion is performed with a phase-transfer emulsification method).

The particles of the self-dispersible polymer are preferable from the viewpoint of discharge stability and liquid stability (in particular, dispersion stability) of the ink containing a pigment. Among these, particles of a self-dispersible polymer containing a carboxyl group are more preferable.

In this case, the dispersion state includes both an emulsion state in which the water-insoluble polymer in the liquid state is emulsified in the aqueous medium and a suspension state in which the water-insoluble polymer in the solid state is suspended in the aqueous medium.

It is preferable that the water-insoluble polymer according to the embodiment be in the suspension state where the water-insoluble polymer in the solid state is suspended, from the viewpoint of a fixing property when a liquid composition is used.

Examples of a method of emulsifying or suspending the self-dispersible polymer, that is, examples of a method of preparing an aqueous dispersion of the self-dispersible polymer include a phase-transfer emulsification method. Examples of the phase-transfer emulsification method include a method in which the self-dispersible polymer is dissolved or dispersed in a solvent (for example, a hydrophilic organic solvent); the resultant is poured into water without adding a surfactant to neutralize a salt-producing group (for example, an acidic group) having a water-insoluble polymer, followed stirring and mixing; the solvent is removed; and as a result, an aqueous dispersion in the emulsion or suspension state is obtained.

The dispersion state of the self-dispersible polymer is a state in which, when a solution which is obtained by dissolving 30 g of water-insoluble polymer in 70 g of an organic solvent (for example, methyl ethyl ketone), a neutralizer (when a salt-producing group is anionic, sodium hydroxide; when a salt-producing group is cationic, acetic acid) which can completely neutralize a salt-producing group of the water-insoluble polymer, and 200 g of water are mixed and stirred (device: stirrer equipped with a stirring blade; rotating speed: 200 rpm; 30 minutes; 25° C.), the dispersion state is visually and stably observed at 25° C. for at least 1 week even after the removal of the organic solvent from the mixed solution.

In addition, the water-insoluble polymer represents a polymer which has a dissolution amount of 10 g or less when being dried at 105° C. for 2 hours and dissolved in 100 g of water at 25° C. The dissolution amount is preferably less than or equal to 5 g and more preferably less than or equal to 1 g. The dissolution amount described herein is a value when a salt-producing group of the water-insoluble polymer is completely neutralized by using sodium hydroxide or acetic acid according to the kind of the salt-producing group.

The aqueous medium contains water and optionally may further contain a hydrophilic organic solvent. In the embodiment, it is preferable that the aqueous medium contain water and a hydrophilic organic solvent having a content of less than or equal to 0.2% by mass with respect to water and it is more preferable the aqueous medium contains only water.

A main chain skeleton of the water-insoluble polymer is not particularly limited, and examples thereof include vinyl polymers and condensation polymers (for example, epoxy resin, polyester, polyurethane, polyamide, cellulose, polyether, polyurea, polyimide, and polycarbonate). Among these, vinyl polymer and polyurethane are particularly preferable.

Preferable examples of monomers constituting the condensation polymer include those disclosed in JP2001-247787A. The polyurethane is synthesized by polymerization of a diol compound and a diisocyanate compound as raw materials. The details of the diol compound and the diisocyanate compound can be found in paragraph [0031] to [0036] of JP2001-247787A.

In addition, preferable examples of the vinyl polymers and monomers constituting the vinyl polymers include those disclosed in JP2001-181549A and JP2002-88294A. In addition, vinyl polymers can be used in which a dissociable group is incorporated into a terminal thereof by radical polymerization of vinyl monomers using a chain transfer agent or polymerization initiator having a dissociable group (or a substituent from which a dissociable group can be derived) and an iniferter or by ion polymerization of compounds using an initiator or a terminator which has a dissociable group (or a substituent from which a dissociable group can be derived).

It is preferable that the polymer particles contain a water-insoluble polymer having a hydrophilic constitution unit and a constitution unit derived from an aromatic group-containing monomer from the viewpoint of self-dispersibility.

The hydrophilic constitution unit is not particularly limited as long as it is derived from a hydrophilic group-containing monomer, and may be derived from one kind of hydrophilic group-containing monomer or from two or more kinds of hydrophilic group-containing monomers. The hydrophilic group is not particularly limited, and may be a dissociable group or a nonionic hydrophilic group.

As the hydrophilic group, a dissociable group is preferable and an anionic dissociable group is more preferable, from the viewpoints of accelerating self-dispersion and of the stability of the emulsion or suspension state. Examples of the dissociable group include a carboxyl group, a phosphoric acid group, and a sulfonic acid group. Among these, a carboxyl group is preferable from the viewpoint of a fixing property of a case where a water-based ink is used.

As the hydrophilic group-containing monomer, a dissociable group-containing monomer is preferable and a dissociable group-containing monomer having an ethylenic unsaturated bond and the dissociable group is more preferable from the viewpoint of self-dispersibility. Examples of the dissociable group-containing monomer include unsaturated carboxylic acid monomers, unsaturated sulfonic acid monomers, and unsaturated phosphoric acid monomers.

Specific examples of the unsaturated carboxylic acid monomers include acrylic acid, methacrylic acid, crotonic acid, itaconic acid, maleic acid, fumaric acid, citraconic acid, and 2-methacryloyloxymethyl succinic acid.

Specific examples of the unsaturated sulfonic acid monomers include styrenesulfonic acid, 2-acrylamide-2-methylpropane sulfonic acid, 3-sulfopropyl (meth)acrylate, and bis-(3-sulfopropyl)itaconic acid ester.

Specific examples of the unsaturated phosphoric acid monomers include vinyl phosphonic acid, vinyl phosphate, bis(methacryloxyethyl)phosphate, diphenyl-2-acryloyloxyethyl phosphate, diphenyl-2-methacryloyloxyethyl phosphate, and dibutyl-2-acryloyloxyethyl phosphate.

Among the dissociable group-containing monomers, the unsaturated carboxylic acid monomers are preferable, acrylic monomers are more preferable, and acrylic acid and methacrylic acid are still more preferable, from the viewpoints of dispersion stability and ink discharge stability.

The particles of the self-dispersible polymer according to the embodiment preferably has a carboxyl group from the viewpoint of self-dispersion and has a polymer having an acid value of 1 mgKOH/g to 100 mgKOH/g. Furthermore, the acid value is more preferably 5 mgKOH/g to 80 mgKOH/g and still more preferably 5 mgKOH/g to 65 mgKOH/g, from the viewpoint of self-dispersibility. When the acid value is greater than or equal to 1 mgKOH/g, the self-dispersibility is stable, and when the acid value is less than or equal to 100 mgKOH/g, water resistance is superior.

The aromatic group-containing monomer is not particularly limited as long as it is a compound having an aromatic group and a polymerizable group. The aromatic group may be a group derived from an aromatic hydrocarbon or may be a group derived from an aromatic heterocycle. In the embodiment, it is preferable that the aromatic group be a group derived from an aromatic hydrocarbon from the viewpoint of the stability of particle configuration in the aqueous medium.

In addition, the polymerizable group may be a condensation polymerizable group or an addition polymerizable group. The polymerizable group is preferably an addition polymerizable group and more preferably a group having an ethylenic unsaturated bond, from the viewpoint of the stability of particle configuration in the aqueous medium.

It is preferable that the aromatic group-containing monomer be a monomer having an aromatic group derived from an aromatic hydrocarbon and an ethylenic unsaturated bond. As the aromatic group-containing monomer, one kind may be used alone or a two or more kinds may be used in combination.

Examples of the aromatic group-containing monomer include phenoxyethyl (meth)acrylate, benzyl (meth)acrylate, phenyl (meth)acrylate, and styrene-based monomers. Among these, from the viewpoint of the balance between hydrophilicity and hydrophobicity of a polymer chain and an ink fixing property, aromatic group-containing (meth)acrylate monomers is preferable, at least one kind selected from phenoxyethyl (meth)acrylate, benzyl (meth)acrylate, and phenyl (meth)acrylate is more preferable, and phenoxyethyl (meth)acrylate or benzyl (meth)acrylate is still more preferable.

"(meth)acrylate" described herein represents acrylate or methacrylate.

As the self-dispersible polymer, an acrylic resin having a constitution unit derived from a (meth)acrylate monomer is preferable and an acrylic resin having a constitution unit derived from an aromatic group-containing (meth)acrylate monomer is more preferable. In this case, the content of the constitution unit derived from an aromatic group-containing (meth)acrylate monomer is preferably 10% by mass to 95% by mass with respect to the total mass of the self-dispersible polymer. When the content of the constitution unit derived from an aromatic group-containing (meth)acrylate monomer is 10% by mass to 95% by mass, the stability of the self-emulsion state or self-suspension state is improved and furthermore an increase in ink viscosity can be suppressed. The content of the aromatic group-containing (meth)acrylate monomer is more preferably 15% by mass to 90% by mass, still more preferably 15% by mass to 80% by mass, and even still more preferably 25% by mass to 70% by mass with respect to the total mass of the self-dispersible polymer, from the viewpoints of the stability of the self-dispersion state, an increase in the stability of particle configuration in the aqueous medium due to the hydrophobic interaction between aromatic rings, and a decrease in the amount of water-soluble components due to appropriately hydrophobic particles.

The self-dispersible polymer can be formed from, for example, a constitution unit derived from an aromatic group-containing monomer and a constitution unit derived from a dissociable group-containing monomer. Optionally, the self-dispersible polymer may further include other constitution units as necessary.

Monomers constituting other constitution units are not particularly limited as long as they are monomers which are copolymerizable with the aromatic group-containing monomer and the dissociable group-containing monomer. Among these, alkyl group-containing monomers are preferable from the viewpoints of the flexibility of a polymer skeleton and the easy control of a glass transition temperature (Tg).

Examples of the alkyl group-containing monomers include:

- alkyl esters of (meth)acrylic acid (preferably, alkyl esters of (meth)acrylic acid having 1 to 4 carbon atoms) including alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate, hydroxyalkyl (meth)acrylates such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate, and dialkylamino alkyl (meth)acrylates such as dimethylamino ethyl (meth)acrylate; and
- (meth)acrylamide-based monomers including N-hydroxyalkyl (meth)acrylamides such as N-hydroxymethyl (meth)acrylamide, N-hydroxyethyl (meth)acrylamide, and N-hydroxybutyl (meth)acrylamide and N-alkoxyalkyl (meth)acrylamides such as N-methoxymethyl (meth)acrylamide, N-ethoxymethyl (meth)acrylamide, N-(n-,iso)butoxymethyl (meth)acrylamide, N-methoxyethyl (meth)acrylamide, N-ethoxyethyl (meth)acrylamide, and N-(n-, iso)butoxyethyl (meth)acrylamide.

Regarding of the water-insoluble polymer constituting the particles of the self-dispersible polymer, the weight average particle size thereof is preferably 3,000 to 200,000, more preferably 5,000 to 150,000, and still more preferably 10,000 to 100,000. When the weight average molecular weight is greater than or equal to 3000, the amount of water-soluble components can be effectively suppressed. In addition, when the weight average molecular weight is less than or equal to 200,000, self-dispersion stability can increase.

The weight average molecular weight is measured using gel permeation chromatography (GPC). HLC-8220GPC (manufactured by Tosoh Corporation) is used as GPC equipment and TSKgeL Super HZM-H, TSKgeL Super HZ4000, and TSKgeL Super HZ2000 (manufactured by Tosoh Corporation, 4.6 mmID×15 cm) are used as columns. The details of GPC can be found in paragraph [0076] of JP2010-155359A.

From the viewpoints of controls of hydrophobicity and hydrophilicity of the polymer, it is preferable that the water-insoluble polymer constituting the particles of the self-dispersible polymer contain 15% by mass to 80% by mass (in terms of copolymerization ratio) of a constitution unit derived from an aromatic group-containing (meth)acrylate monomer (preferably, a construction unit derived from phenoxyethyl (meth)acrylate and/or a constitution unit derived from benzyl (meth)acrylate) with respect to the total mass of the self-dispersible polymer particles.

In addition, from the viewpoints of controls of hydrophobicity and hydrophilicity of the polymer, it is preferable that the water-insoluble polymer contain 15% by mass to 80% by mass (in terms of copolymerization ratio) of a constitution unit derived from an aromatic group-containing (meth)acrylate monomer, a constitution unit derived from a carboxyl group-containing monomer, and a constitution unit derived from an alkyl group-containing monomer (preferably, a constitution unit derived from an alkyl ester of (meth)acrylic acid), and it is more preferable that the water-insoluble polymer contain 15% by mass to 80% by mass (in terms of copolymerization ratio) of a constitution unit derived from phenoxyethyl (meth)acrylate and/or a constitution unit derived from benzyl (meth)acrylate, a constitution unit derived from a carboxyl group-containing monomer, and a constitution unit derived from an alkyl group-containing monomer (preferably, a constitution unit derived from an alkyl ester of (meth)acrylic acid having 1 to 4 carbon atoms). Furthermore, it is preferable that the acid value of the water-insoluble polymer be 25 mgKOH/g to 100 mgKOH/g and the weight average molecular weight be 3,000 to 200,000, and it is more preferable that the acid value be 25 mgKOH/g to 95 mgKOH/g and the weight average molecular weight be 5,000 to 150,000.

Hereinafter, specific examples (Exemplary Compound B-01 to B-19) of the water-insoluble polymer constituting the polymer particles will be described. However, the embodiment is not limited thereto. Numerical values in the brackets indicates mass ratios of copolymerization components.

B-01: phenoxyethyl acrylate/methyl methacrylate/acrylic acid copolymer (50/45/5)

B-02: phenoxyethyl acrylate/benzyl methacrylate/isobutyl methacrylate/methacrylic acid copolymer (30/35/29/6)

B-03: phenoxyethyl methacrylate/isobutyl methacrylate/methacrylic acid copolymer (50/44/6)

B-04: phenoxyethyl acrylate/methyl methacrylate/ethylacrylate/acrylic acid copolymer (30/55/10/5)

B-05: benzyl methacrylate/isobutyl methacrylate/methacrylic acid copolymer (35/59/6)

B-06: styrene/phenoxyethyl acrylate/methyl methacrylate/acrylic acid copolymer (10/50/35/5)

B-07: benzyl acrylate/methyl methacrylate/acrylic acid copolymer (55/40/5)

B-08: phenoxyethyl methacrylate/benzyl acrylate/methacrylic acid copolymer(45/47/8)

B-09: styrene/phenoxyethyl acrylate/butyl methacrylate/acrylic acid copolymer (5/48/40/7)

B-10: benzyl methacrylate/isobutyl methacrylate/cyclohexyl methacrylate/methacrylic acid copolymer (35/30/30/5)

B-11: phenoxyethyl acrylate/methyl methacrylate/butyl acrylate/methacrylic acid copolymer(12/50/30/8)

B-12: benzyl acrylate/isobutyl methacrylate/acrylic acid copolymer (93/2/5)

B-13: styrene/phenoxyethyl methacrylate/butyl acrylate/acrylic acid copolymer (50/5/20/25)

B-14: styrene/butyl acrylate/acrylic acid copolymer (62/35/3)

B-15: methyl methacrylate/phenoxyethyl acrylate/acrylic acid copolymer (45/51/4)

B-16: methyl methacrylate/phenoxyethyl acrylate/acrylic acid copolymer (45/49/6)

B-17: methyl methacrylate/phenoxyethyl acrylate/acrylic acid copolymer (45/48/7)

B-18: methyl methacrylate/phenoxyethyl acrylate/acrylic acid copolymer (45/47/8)

B-19: methyl methacrylate/phenoxyethyl acrylate/acrylic acid copolymer (45/45/10)

Regarding the molecular weight of the polymer constituting the polymer particles (including the particles of the self-dispersible polymer), the weight average molecular weight thereof is preferably 3,000 to 200,000, more preferably 5,000 to 150,000, and still more preferably 10,000 to 100,000. When the weight average molecular weight is greater than or equal to 3,000, the amount of water-soluble components can be efficiently suppressed. In addition, when the weight average molecular weight is less than or equal to 200,000, self-dispersion stability can increase.

The weight average molecular weight is measured using gel permeation chromatography (GPC). HLC-8220GPC (manufactured by Tosoh Corporation) is used as GPC equipment and TSKgeL Super HZM-H, TSKgeL Super HZ4000, and TSKgeL Super HZ2000 (manufactured by Tosoh Corporation, 4.6 mmID×15 cm) are used as columns. The details of GPC can be found in paragraph [0076] of JP2010-155359A.

A method of preparing the water-insoluble polymer constituting the polymer particles is not particularly limited. Examples thereof include a method of performing emulsion polymerization in the presence of a polymerizable surfactant to form a covalent bond between the polymerizable surfactant and the water-insoluble polymer; a method (solution polymerization method) of performing solution polymerization of a monomer mixture including a hydrophilic group-containing monomer and an aromatic group-containing monomer; and a method of performing copolymerization with a well-known polymerization method such as a bulk polymerization method. Among these polymerization methods, a solution polymerization method is preferable and a solution polymerization method using an organic solvent is more preferable, from the viewpoint of application stability of ink droplets.

It is preferable that the polymer particles contain a polymer synthesized in an organic solvent, the polymer have carboxyl groups (preferably, the acid value thereof is 5 mgKOH/g to 65 mgKOH/g), a part of or all the carboxylic groups of the polymer be neutralized, and the polymer particles be prepared as a polymer dispersion in which water is the continuous phase. That is, it is preferable that the method of preparing the polymer particles according to the embodiment include a step of synthesizing a polymer in an organic solvent and a dispersion step of neutralizing a part of or all the carboxylic groups of the polymer to obtain an aqueous dispersion.

It is preferable that the dispersion step include the following Steps (1) and (2).

Step (1): a step of stirring a mixture including the polymer (the water-insoluble polymer), an organic solvent, a neutralizer, and an aqueous medium.

Step (2): a step of removing the organic solvent from the mixture.

It is preferable that Step (1) be a process of dissolving the polymer (the water-insoluble polymer) in an organic solvent, gradually adding a neutralizer and an aqueous medium thereto and mixing the resultant, and stirring the resultant to obtain a dispersion. In this way, by adding a neutralizer and an aqueous medium to a water-insoluble polymer solution in which the water-insoluble polymer is dissolved in an organic solvent, the self-dispersible polymer particles with a particle size, which have higher preservation stability, can be obtained without requiring a strong shearing force. A method of stirring a mixture is not particularly limited. A mixing and stirring device, which is generally used and optionally a disperser such as an ultrasonic disperser or a high-pressure homogenizer can be used.

Preferable examples of the organic solvent include alcohol-based solvents, ketone-based solvents, and ether-based solvents. The details of the organic solvents can be found in paragraph [0109] of JP2011-42150A. Among these, ketone-based solvents such as methyl ethyl ketone and alcohol-based solvents such as isopropyl alcohol are preferable, and a combination of isopropyl alcohol and methyl ethyl ketone is preferable from the viewpoint of alleviating polarity change when the phase is transferred from water to oil. By using the combination of the solvents, coagulation setting and coalescence between particles do not occur and the self-dispersible polymer particles with a fine particle size which have high dispersion stability can be obtained.

The neutralizer is used for neutralizing a part of or all the dissociable groups to form the emulsion state or suspension state in which the self-dispersible polymer is stable in water. When the self-dispersible polymer has an anionic dissociable group (for example, a carboxyl group) as a dissociable group, examples of the neutralizer to be used include basic compounds such as an organic amine compound, ammonia, and a hydroxide of alkali metal. The details of the neutralizer can be found in paragraph [0110] of JP2011-42150A. Among these, sodium hydroxide, potassium hydroxide, triethylamine, and triethanolamine are preferable from the viewpoints of dispersion stability of the self-dispersible polymer particles in water.

It is preferable that 5% by mole to 120% by mole of the basic compound be used with respect to 100% by mole of the dissociable group. The details of the ratio described herein can be found in paragraph [0111] of JP2011-42150A.

In Step (2), the organic solvent is removed from the dispersion obtained in Step (1) with an ordinary method such as distillation under reduced pressure and the phase is transferred to water. As a result, the aqueous dispersion of the polymer particles can be obtained. The organic solvent in the obtained aqueous dispersion is substantially removed. The amount of the organic solvent is preferably less than or equal to 0.2% by mass and more preferably less than or equal to 0.1% by mass with respect to the total mass of the aqueous dispersion.

Regarding the average particle size of the polymer particles (in particular, the self-dispersible polymer particles), the volume average particle size thereof is preferably 10 nm to 400 nm, more preferably 10 nm to 200 nm, still more preferably 10 nm to 100 nm, and even still more preferably 10 nm to 50 nm. When the average particle size is greater than or equal to 10 nm, preparation aptitude is improved. In addition, when the average particle size is less than or equal to 400 nm, preservation stability is improved. In addition, the particle size distribution of the polymer particles is not particularly limited, and may be a wide particle size distribution or a monodispersed particle size distribution. In addition, the water-insoluble polymer particles may be used as a mixture of two or more kinds thereof.

The average particle size and particle size distribution of the polymer particles can be obtained by measuring the volume average particle size according to a dynamic light scattering method using a Nanotrac particle size distribution analyzer UPA-EX150 (manufactured by Nikkiso Co., Ltd.).

The glass transition temperature (Tg) of the polymer particles is preferably 5° C. to 60° C., more preferably 10° C. to 60° C., and still more preferably 15° C. to 50° C. from the viewpoint of preservation stability of the water-based ink.

When the glass transition temperature is within the above-described range, it is difficult for an image to be hard or sticky, the texture of an image (for example, without hardness and stickiness of an image) such as touch can be improved and the scratch resistance of an image can be further improved.

One kind may be used alone or a mixture of two or more kinds may be used as the polymer particles (in particular, the self-dispersible polymer particles).

The content of the polymer particles in the water-based ink is preferably 1% by mass to 30% by mass and more preferably 5% by mass to 15% by mass with respect to the total mass of the water-based ink, from the viewpoint of the scratch resistance of an image.

Amine Compound

The water-based ink according to the embodiment contains at least one kind of amine compound having at least one hydroxyl group. When the water-based ink contains the polymer particles and the amine compound so as to have both an amine structure and a hydroxyl group, the adhesion of an image, which is obtained using the water-based ink, with a recording substrate having ink non-absorbency or low ink-absorbency is improved and the scratch resistance of the image is improved.

In this embodiment, the amine compound has an amine structure and one or two or more hydroxyl groups. As a result, it is considered that this amine compound contributes to an improvement in the adhesion of the ink (image) with a recording substrate having ink non-absorbency or low ink-absorbency. The reason is not clear but is considered to be that such an amine compound functions as an adhesion aid for bridging between the recording substrate and the ink (image). That is, since a recording substrate having ink non-absorbency or low ink-absorbency is relatively non-polar in general, there are many cases in which the recording substrate does not have an amount of polar groups which can sufficiently secure the adhesion with the ink. However, the recording substrate having ink non-absorbency or low ink-absorbency has polar groups derived from the composition of raw materials or polar groups derived from the oxidation of raw materials during preservation to no small extent. Therefore, it is considered that the amine compound having an amine structure and a hydroxyl group interacts with the polar groups which are included in the recording substrate to no small extent and furthermore interacts with components (in particular, polymer components) in the ink so as to increase the adhesion between the recording substrate and the ink.

The polar groups on the recording substrate having ink non-absorbency or low ink-absorbency described herein can be estimated by measuring elements, which seem to constitute the polar groups, using a surface element analyzer such as ESCA (X-ray photoelectron spectrometer; for example ESCA-3400 manufactured by Shimadzu Corporation).

Examples of the element which seem to constitute the polar groups include oxygen atoms and nitrogen atoms. Among the elements which seem to constitute the polar groups, oxygen atoms are preferable and the amount thereof particularly relates to an improvement in the adhesion of the ink. The amount of oxygen atoms on the recording substrate having ink non-absorbency or low ink-absorbency is preferably 0.1% to 20%, more preferably 0.5% to 13%, and still more preferably 1% to 8% with respect to the amount of carbon atoms. The larger the amount of oxygen atoms, the more preferable from the viewpoint of improvement in the adhesion of the ink (image). However, when the amount of oxygen atoms is excessively large, adverse effects appear in a recording substrate as a product. Therefore, it is preferable that the amount of oxygen atoms be limited to a specific range.

The above-described amounts represented by "%" are values measured with a ESCA method and indicates the ratio of oxygen atoms with respect to the total sum of electron intensities which are produced and observed from the respective elements.

The number of hydroxyl groups included in the amine compound is not particularly limited, and is preferably 1 to 10, more preferably 2 to 10, and still more preferably 3 to 8. When the number of hydroxyl groups is more than or equal to 1, an effect of improving the adhesion of the ink (image) can be obtained. In addition, when the number of hydroxyl groups is less than or equal to 10, the stability of the ink can be more satisfactorily maintained. When the number of hydroxyl groups is more than or equal to 2 and furthermore more than or equal to 3, the adhesion of the ink (image) is further improved.

It is preferable that the amine compound according to the embodiment be a compound represented by the following Formula (1)

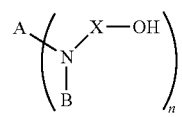

Formula (1)

In the formula (1), X represents an alkylene group having 1 to 10 carbon atoms or an alkyleneoxy alkylene group having 1 to 10 carbon atoms, the alkylene group or the alkyleneoxy alkylene group represented by X may be unsubstituted or substituted; n represents 1 or 2; when n=1, A and B each independently represent a hydrogen atom or an alkyl group and B and A or B and X may be bonded and linked to each other; and when n=2, A represents an alkylene group or an alkylamine group, B represents a hydrogen atom or an alkyl group, and B and X may be bonded and linked to each other.

X represents an alkylene group having 1 to 10 carbon atoms which may be substituted or an alkyleneoxy alkylene group having 1 to 10 carbon atoms which may be substituted.

Examples of the alkylene group include a methylene group, an ethylene group, a propylene group, and a butylene group. Among these, an alkylene group having 1 to 5 carbon atoms is preferable and ethylene and propylene are more preferable.

Examples of the alkyleneoxy alkylene group include an ethyleneoxy ethylene group ($—C_2H_4OC_2H_4—$) and a propyleneoxy ethylene group ($—C_3H_6OC_2H_4—$). Among these, an alkyleneoxy alkylene group having 4 to 6 carbon atoms is preferable and an ethyleneoxy ethylene group is more preferable.

When the alkylene group or the alkyleneoxy alkylene group represented by X is substituted, examples of a substituent thereof include a hydroxyl group and an alkyl group (for example, methyl, ethyl, propyl, or butyl). The alkyl group may be further substituted with a hydroxyl group. In this case, examples of a substituent include a hydroxymethyl group, a hydroxyethyl group, and a hydroxypropyl group.

n represents 1 or 2, and it is preferable that n represent 1 from the viewpoints of the adhesion and scratch resistance of an image.

When n=1, A and B in the formula (1) will be described.

When n=1, A and B each independently represent a hydrogen atom, or a substituted or unsubstituted alkyl group. As the alkyl group, an alkyl group having 1 to 4 carbon atoms is preferable, and examples thereof include a methyl group, an ethyl group, a propyl group, and a butyl group. Among these, an alkyl group having 1 to 2 carbon atoms is more preferable and a methyl group and an ethyl group are still more preferable.

When the alkyl group represented by A or B is substituted, examples of a substituent thereof include a hydroxyl group and an alkyl group (for example, methyl, ethyl, propyl, or butyl). The alkyl group may be further substituted with a hydroxyl group. In this case, examples of a substituted alkyl group include a hydroxymethyl group, a hydroxyethyl group, and a hydroxypropyl group.

In addition, when n=1 in the formula (1), B and A or B and X may be bonded and linked to each other. Specifically, B and A or B and X may be bonded and linked to each other to form Linking Group 1 having the following structure and form a ring structure.

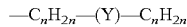   Linking Group 1

In Linking Group 1, Y represents an oxygen atom, NH, or a single bond. n is determined based on the number of carbon atoms of A, B, and X. It is preferable that the number of carbon atoms in X is 1 to 10 and the number of carbon atoms in A and B is 1 to 4.

Specifically, B and A or B and X may be bonded and linked to each other to form a morpholine ring, a pyrrolidine ring, a piperidine ring, and a piperazine ring as the ring structure.

When n=2, A and B in the formula (1) will be described.

When n=2, A represents an unsubstituted or substituted alkylene group or an unsubstituted or substituted alkylamine group. In addition, B represents a hydrogen atom or an unsubstituted or substituted alkyl group.

As the alkylene group represented by A, an alkylene group having 1 to 4 carbon atoms is preferable, and examples thereof include a methylene group, an ethylene group, a propylene group, and a butylenes group. Among these, an alkylene group having 2 or 3 carbon atoms is preferable, and an ethylene group and a propylene group are more preferable.

The alkylamine group represented by A is represented by "—$R^1$—N($R^2$)—$R^3$—" (N: nitrogen atom) in which $R^1$ and $R^3$ are linked to a nitrogen atom (N) in the Formula (1).

$R^1$ and $R^3$ each independently represent an alkylene group having 1 to 4 carbon atoms. Examples of the alkylene group include a methylene group, an ethylene group, a propylene group, and a butylene group. Among these, an alkylene group having 2 or 3 carbon atoms is preferable.

In addition, $R^2$ represents a hydrogen atom, an alkyl group, or an alkyleneoxy alkyl group.

As the alkyl group represented by $R^2$, an alkyl group having 1 to 4 carbon atoms is preferable, and examples thereof include a methyl group, an ethyl group, a propyl group, and a butyl group. Among these, an alkyl group having 1 to 3 carbon atoms is more preferable, and a methyl group, an ethyl group, and a propyl group are still more preferable.

Examples of the alkyleneoxy alkyl group represented by $R^2$ include an ethyleneoxy ethyl group (—$C_2H_4OC_2H_5$) and propyleneoxy ethyl group (—$C_3H_6OC_2H_5$). Among these, an alkyleneoxy alkyl group having 4 to 6 carbon atoms is preferable, and an ethyloxy ethyl group is more preferable.

The alkylene group represented by A and the alkylene group represented by $R^1$ or $R^3$ may be further substituted. Examples of a substituent thereof include a hydroxyl group and an alkyl group (for example, methyl, ethyl, propyl, or butyl). The alkyl group may be further substituted with a hydroxyl group. In this case, examples of a substituent thereof include a hydroxymethyl group, a hydroxyethyl group, and a hydroxypropyl group.

In addition, the alkyl group and the alkyleneoxy alkyl group represented by $R^2$ may be further substituted. Examples of a substituent thereof include a hydroxyl group, a hydroxymethyl group, a hydroxyethyl group, and a hydroxypropyl group.

When n=2, B represents a hydrogen atom or an unsubstituted or substituted alkyl group.

As the alkyl group represented by B, an alkyl group having 1 to 4 carbon atoms is preferable, and examples thereof include a methyl group, an ethyl group, a propyl group, and a butyl group. Among these, an alkyl group having 2 or 3 carbon atoms is more preferable, and an ethyl group or a propyl group is still more preferable.

When the alkyl group represented by B is substituted, examples of a substituent thereof include a hydroxyl group and an alkyl group (for example, methyl, ethyl, propyl, or butyl). It is preferable that the alkyl group represented by B be further substituted with a hydroxyl group, and examples thereof include a hydroxymethyl group, a hydroxyethyl group, and a hydroxypropyl group.

In addition, when n=2 in the formula (1), B and X may be bonded and linked to each other. Specifically, B and X may be bonded and linked to each other to form Linking Group 1 described above and form a ring structure.

In the above description, it is preferable that the amine compound represented by the formula (1) be an amine compound in which X represents an ethylene group and n represents 1 or 2. When n=1, A and B each independently represent a hydrogen atom or an alkyl group having 2 to 4 carbon atoms and a hydroxyl group (B and A or B and X may be bonded and linked to each other) and an amine compound having three or more hydroxyl groups in the molecule is preferable. When n=2, A represents an alkylamine group having 4 to 6 carbon atoms, B represents a hydroxyethyl group, and an amine compound having three or more hydroxyl groups in the molecule is preferable.

Hereinafter, specific examples of the amine compound according to the embodiment are shown. However, the embodiment is not limited thereto.

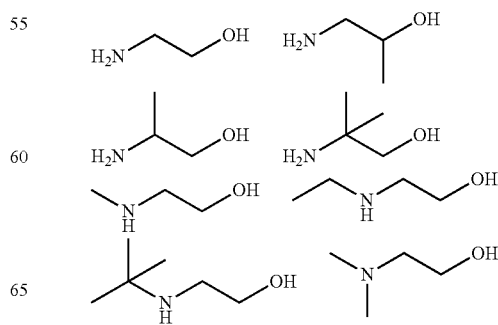

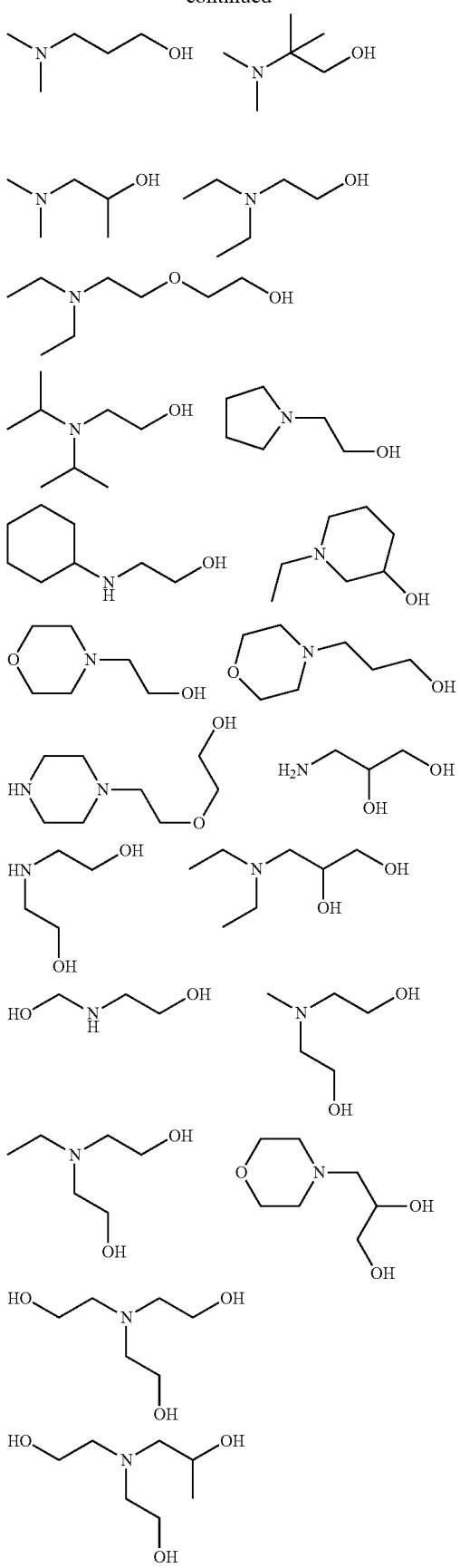
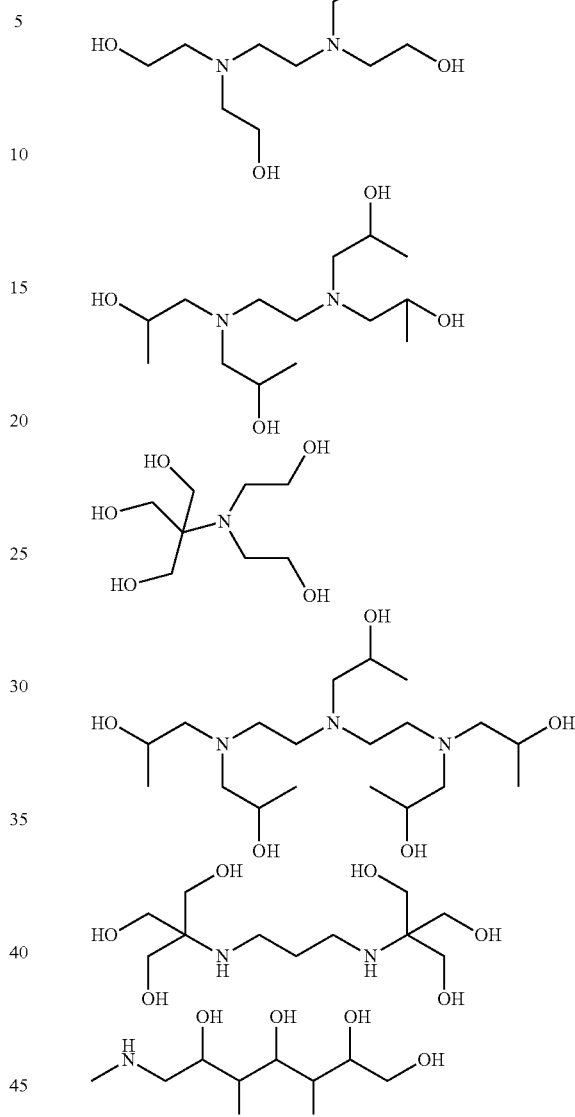

The content of the amine compound in the water-based ink is 0.01% by mass to 20% by mass, more preferably 0.1% by mass to 10% by mass, and still more preferably 0.5% by mass to 5% by mass with respect to the total amount of the ink. When the content of the amine compound is greater than or equal to 0.01% by mass, an effect of improving the adhesion of the ink (image) is obtained. In addition, when the content of the amine compound is less than or equal to 20% by mass, the stability of the water-based ink is further improved.

Colorant

The water-based ink according to the embodiment contains at least one kind of colorant. A pigment, a dye, or the like is preferable as the colorant. Among these, a pigment is preferable from the viewpoints of the light resistance of an image and the like. The pigment is not particularly limited and can be appropriately selected according to the purpose. For example, either an organic pigment or an inorganic pigment may be used. As the pigment, a pigment which is substantially insoluble or insoluble in water is preferable from the viewpoint of ink colorability.

Examples of the organic pigment include polycyclic pigments such as azo lake pigments, azo pigments, phthalocyanine pigments, perylene and perinone pigments, anthraquinone pigments, quinacridone pigments, dioxazine pigments, diketo-pyrrolo-pyrrole pigments, thioindigo pigments, isoindolinone pigments, and quinophthalone pigments; dye lakes such as basic dye type lakes and acidic dye type lakes; and nitro pigments, nitroso pigments, aniline black, and daylight fluorescent pigments. In addition, examples of the inorganic pigments include titanium oxides, iron oxide-based pigments, and carbon black-based pigments. Pigments which are not described in the color index may also be used as long as they are dispersible in the water-phase.

In addition, pigments obtained by treating surfaces of the above-described pigments with a surfactant or a polymeric dispersant or graft carbons and the like may also be used.

Dispersant

The water-based ink according to the embodiment contains at least one kind of dispersant. As a dispersant for the pigment, either a polymeric dispersant or a low-molecular-weight surfactant-type dispersant may be used. In addition, as the polymeric dispersant, either a water-soluble dispersant or a water-insoluble dispersant may be used. "Water-insoluble" described herein represents a dissolution amount of a dispersant being less than or equal to 10 g when the dispersant is dried at 105° C. for 2 hours and dissolved in 100 g of water at 25° C.

The low-molecular-weight surfactant-type dispersant can stably disperse a pigment in a water-soluble medium while maintaining the water-based ink at a low viscosity. The low-molecular-weight surfactant-type dispersant is a low-molecular-weight dispersant having a molecular weight of 2,000 or greater. In addition, the molecular weight of the low-molecular-weight surfactant-type dispersant is preferably 100 to 2,000 and more preferably 200 to 2,000.

The low-molecular-weight surfactant-type dispersant has a structure having a hydrophilic group and a hydrophobic group. In addition, one or more hydrophilic groups and one or more hydrophobic groups each only have to be independently included in one molecule, and the low-molecular-weight surfactant-type dispersant may include plural kinds of hydrophilic groups and hydrophobic groups. In addition, the low-molecular-weight surfactant-type dispersant may appropriately have a linking group for linking the hydrophilic group and the hydrophobic group.

Examples of the hydrophilic group include anionic groups, cationic groups, nonionic groups, and betaines groups which are combinations thereof. When the hydrophilic group is anionic, any hydrophilic groups may be used as long as they have negative charge. As the hydrophilic group, a phosphoric acid group, a phosphonic acid group, a phosphinic acid group, a sulfuric acid group, a sulfonic acid group, a sulfinic acid group, or a carboxylic acid group is preferable, a phosphoric acid group or a carboxylic acid group is more preferable, and a carboxylic acid group is still more preferable. Any cationic groups may be used as long as they have positive charge. An organic cationic substituent is preferable and a cationic group of nitrogen or phosphorus is more preferable. In addition, a pyridinium cation or ammonium cation group is still more preferable. Examples of the nonionic group include polyethylene oxide, polyglycerin, and a sugar unit.

It is preferable that the hydrophilic group be an anionic group. As the anionic group, a phosphoric acid group, a phosphonic acid group, a phosphinic acid group, a sulfuric acid group, a sulfonic acid group, a sulfinic acid group, or a carboxylic acid group is preferable, a phosphoric acid group or a carboxylic acid group is more preferable, and a carboxylic acid group is still more preferable.

It is preferable that the hydrophobic group have, for example, a hydrocarbon-based, fluorocarbon-based, silicone-based structure, and it is more preferable that the hydrophobic group have a hydrocarbon-based structure. In addition, the hydrophobic group may have a linear or branched structure. In addition, the hydrophobic group may have one or two or more branched structures. When two or more branched structures are used, the low-molecular-weight surfactant-type dispersant may include plural kinds of hydrophobic groups.

In addition, as the hydrophobic group, a hydrocarbon group having 2 to 24 carbon atoms is preferable, a hydrocarbon group having 4 to 24 carbon atoms is more preferable, and a hydrocarbon group having 6 to 20 carbon atoms is still more preferable.

Among the polymeric dispersants, examples of the water-soluble dispersant include hydrophilic polymer compounds. Examples of natural hydrophilic polymer compounds include plant polymers such as gum arabic, gum tragacanth, guar gum, gum karaya, locust bean gum, arabinogalactan, pectin, and quince seed starch; algae polymers such as alginic acid, carrageenan, and agar; animal polymers such as gelatin, casein, albumin and collagen; and microbial polymers such as xanthene gum and dextran.

In addition, examples of hydrophilic polymer compounds obtained by chemically modifying natural raw materials include cellulose polymers such as methyl cellulose, ethyl cellulose, hydroxyethyl cellulose, hydroxypropyl cellulose, and carboxymethyl cellulose; starch polymers such as sodium starch glycolate, and sodium starch phosphate; and algae polymers such as sodium alginate and propylene glycol alginate.

Furthermore, examples of synthetic hydrophilic polymer compounds include vinyl polymers such as polyvinyl alcohol, polyvinyl pyrrolidone and polyvinyl methyl ether; acrylic resins such as non-crosslinked polyacrylamide, polyacrylic acid and alkali metal salts thereof, or water-soluble styrene acrylic resins; water-soluble styrene maleic acid resins; water-soluble vinylnaphthalene acrylic resins; water-soluble vinylnaphthalene maleic acid resins; polyvinyl pyrrolidone; polyvinyl alcohol; alkali metal salts of formalin condensates of β-naphthalene sulfonic acid; polymer compounds having, at a side chain, a salt of a cationic functional group such as a quaternary ammonium group or an amino group; and natural polymer compounds such as ceramics.

Among these, a polymer compound having a carboxyl group is preferable from the viewpoint of dispersion stability of the pigment. Polymer compounds having a carboxyl group are particularly preferable, for example, acrylic resins (for example, water-soluble styrene acrylic resins), water-soluble styrene maleic acid resins, water-soluble vinylnaphthalene acrylic resins, and water-soluble vinylnaphthalene maleic acid resins.

Among the polymeric dispersants, examples of the water-insoluble dispersants include polymers having both a hydrophobic group and a hydrophilic group. Examples thereof include styrene-(meth)acrylic acid copolymers, styrene-(meth)acrylic acid-(meth)acrylic acid ester copolymers, (meth)acrylic acid ester-(meth)acrylic acid copolymers, polyethylene glycol (meth)acylate-(meth)acrylic acid copolymers, vinyl acetate-maleic acid copolymers, and styrene-maleic acid copolymers.

The weight average molecular weight of the polymeric dispersant is preferably 3,000 to 200,000, more preferably 5,000 to 100,000, still more preferably 5,000 to 80,000, and even still more preferably 10,000 to 60,000.

The weight average molecular weight is measured using gel permeation chromatography (GPC) in the same manner as the case of the polymer particles.

The polymeric dispersant contain preferably a polymer having a caryboxyl group from the viewpoint of self-dispersibility, more preferably a polymer having a carboxyl group and an acid value of 100 mgKOH/g or less, and still more preferably a polymer having a carboxyl group and an acid value of 25 mgKOH/g to 100 mgKOH/g.

In addition, the mixing ratio of the pigment to the dispersant (pigment:dispersant) is preferably 1:0.06 to 1:3, more preferably 1:0.125 to 1:2, and still more preferably 1:0.125 to 1:1.5.

A dye may be used instead of the pigment. When a dye is used, a dye which is supported on a water-insoluble carrier can be used. A well-known dye can be used without limitation as the dye, and dyes disclosed in JP2001-115066A, JP2001-335714A, and JP2002-249677A are preferably used. The carrier can be selected among inorganic materials, organic materials, and complex materials thereof without limitation. Specifically, carriers disclosed in JP2001-181549A and JP2007-169418A are preferably used.

The carrier (water-insoluble colorant particles) which supports the dye can be used with a dispersant as an aqueous dispersion. As the dispersant, the above-described dispersants are preferably used.

From the viewpoint of the scratch resistance and quality of an image, it is preferable that the water-based ink according to the embodiment contain a pigment and a dispersant and it is more preferable that the water-based ink contain an organic pigment and a polymeric dispersant as a water-dispersible pigment in which at least a part of surfaces of the pigment particles are coated with the polymeric dispersant. Furthermore, it is still more preferable that the water-based ink contain an organic pigment and a polymeric dispersant having a carboxyl group as a water-dispersible pigment in which at least a part of surfaces of the pigment particles are coated with the polymeric dispersant having a carboxyl group.

The average particle size of the pigment in the dispersion state is preferably 10 nm to 200 nm, more preferably 10 nm to 150 nm, and still more preferably 10 nm to 100 nm. When the average particle size is less than or equal to 200 nm, color reproduction is improved and application characteristics when ink droplets are applied with an ink jet method are improved. When the average particle size is greater than or equal to 10 nm, light resistance is improved. In addition, the particle size distribution of the colorant is not particularly limited, and may be a wide particle size distribution or a monodispersed particle size distribution. In addition, a colorant having a monodisperse particle size distribution may be used as a mixture of two or more kinds.

The average particle size of the pigment in the dispersion represents a value in a state where the ink is prepared (liquid ink is prepared). However, the same shall be applied to a so-called concentrated ink dispersion which is the previous state to the state where the ink is prepared (liquid ink is prepared).

The average particle size of the pigment in the dispersion state and the average particle size and particle size distribution of the polymer particles described below can be obtained by measuring the volume average particle size according to a dynamic light scattering method using a Nanotrac particle size distribution analyzer UPA-EX150 (manufactured by Nikkiso Co., Ltd.).

As the pigment, one kind may be used alone, or two or more kinds may be used in combination.

The content of the pigment in the water-based ink is preferably 1% by mass to 25% by mass and more preferably 2% by mass to 15% by mass with respect to the total mass of the ink, from the viewpoint of image density.

Wax Particles

It is preferable that the water-based ink according to the embodiment contain the polymer particles and wax particles. When the water-based ink contains the wax particles, the coefficient of friction on a surface of an image is reduced and scratch resistance can be further improved. In addition, the wax particles can improve the texture of an image (for example, without hardness and stickiness of an image) such as touch.

The content of the wax particles in the water-based ink is preferably greater than or equal to 0.5% by mass and less than 8% by mass (in terms of solid content concentration of wax) with respect to the total amount of the water-based ink. When the content of the wax particles in the water-based ink is less than 8% by mass, an ink discharge property is superior, the hardness or stickiness of an image is suppressed to satisfactorily maintain the texture, and scratch resistance is further improved. The content being greater than or equal to 0.5% by mass represents that the water-based ink contains a large amount of the wax particles. The content of the wax particles in the water-based ink is preferably greater than or equal to 1% by mass and less than 8% by mass and more preferably 1% by mass to 6% by mass.

Examples of the wax particles include particles of natural waxes and synthetic waxes.

Examples of the natural waxes include petroleum waxes, plant waxes, and animal waxes. Examples of the petroleum waxes include paraffin wax, microcrystalline wax, and petrolatum. Examples of the plant waxes include carnauba wax, candelilla wax, rice wax, and Japanese wax. Examples of the animal waxes include lanolin and beeswax.

Examples of the synthetic waxes include synthetic hydrocarbon-based waxes and modified waxes. Examples of the synthetic hydrocarbon-based waxes include polyethylene wax and Fischer-Tropsch wax. Examples of the modified waxes include paraffin wax derivatives, montan wax derivatives, and microcrystalline wax derivatives.

Among the natural waxes and the synthetic waxes, carnauba wax is preferable from the viewpoints of improving the scratch resistance of an image and improving image intensity in the post-treatment of image samples (treatment for a book). In addition, a paraffin wax in which a hydrocarbon having 20 to 40 carbon atoms is a main component is preferable from the viewpoints of improving the glossiness of an image and preventing water in the water-based ink from being evaporated at nozzle tips to improve a water retention effect. In addition, polyethylene wax is preferable from the viewpoints of improving compatibility with a resin and easily obtaining a uniform and superior image. Polyethylene wax is preferable from the viewpoint of applying wettability. Polyethylene wax is easily modified. For example, glycol-modified polyethylene wax can obtain a wetting effect due to glycol and thus is effect for maintaining the wettability of the water-based ink at nozzle tips. It is preferable that the water-based ink contain polyethylene wax from the viewpoint of capable of further increasing ink discharge stability.

Among these, wax particles of a linear higher fatty acid ester and hydrocarbon-based wax particles are preferable.

The melting point (Tm) of the wax particles is preferably 50° C. to 150° C. and more preferably 50° C. to 140° C. When the melting point is greater than or equal to 50° C., the smoothness of an image is improved and the scratch resistance can be further improved. In addition, when the melting point is less than or equal to 150° C., the smoothness of an image is improved and the scratch resistance can be further improved.

The ink may contain the wax particles (lubricant) in any one of the solution states where an appropriate solvent is dissolved, the emulsified dispersion state, and the solid-particle-dispersed state. It is preferable that the wax particles be added in the dispersion state where the particles are dispersed, for example, in the aqueous dispersion state (specifically, in the emulsion state (emulsified dispersion state) or the suspension state (solid-particle-dispersed state)) where the wax particles are dispersed in water.

Examples of an emulsion method include a method of dissolving the wax particles in an oil such as dibutylphthalate, tricresyl phosphate, dioctyl sebacate, or tri(2-ethylhexyl) phosphate or in an auxiliary solvent such as ethyl acetate or cyclohexanone; and adding an emulsifying dispersant to mechanically obtain an emulsified dispersion. At this time, in order to adjust the viscosity or refractive index of oil droplets, it is preferable that α-methyl styrene oligomer, poly(t-butyl acrylamide), or the like be added.

Examples of a method of dispersing solid particles include a method of dispersing lubricant powder in an appropriate solvent such as water using a ball mill, a colloid mill, a vibration ball mill, a sand mill, a jet mill, a roller mill, or ultrasonic waves to obtain a solid dispersion. At this time, a protective colloid (for example, polyvinyl alcohol) and a surfactant (anionic surfactant such as sodium triisopropylnaphthalenesulfonate (a mixture having three isopropyl groups at different substitution positions)) may be used. In the above-described mills, beads such as zirconia beads are generally used as a dispersion medium. The aqueous dispersion may contain a preservative (for example, benzisothiazolinone sodium salt).

It is preferable that the wax particles be used with an emulsion dispersion method as an emulsified dispersion. At this time, the average particle size of the dispersed particles (wax particles) in the emulsified dispersion is preferably 0.01 μm to 10 μm, more preferably 0.05 μm to 5 μm, and still more preferably 0.1 μm to 2 μm. The emulsion dispersion method and the emulsified dispersion will be described below.

It is preferable that the wax particles be used in the emulsified dispersion form by using an emulsifying dispersant.

The emulsifying dispersant can be appropriately selected among many well-known emulsifying dispersants of the related art. Among these, an emulsifying dispersant represented by the following formula (2) is preferable.

$(R^1)_a\text{-}G\text{-}(D)_d$           (2)

In the formula (2), $R^1$ represents a linear, branched, or cyclic alkyl group having 10 to 60 carbon atoms, a linear, branched, or cyclic alkenyl group having 10 to 60 carbon atoms, a linear, branched, or cyclic aralkyl group having 10 to 60 carbon atoms, or an aryl group having 10 to 60 carbon atoms, which may be substituted or unsubstituted.

Preferable examples of a compound represented by $R^1$ include an alkyl represented by $C_gH_{2g+1}$ (g represents an integer of 10 to 60). Specific examples thereof include dodecyl, myristyl, cetyl, stearyl, oleyl, eicosyl, docosyl, triacontyl, tetracontyl, pentacontyl, dinonylphenyl, didodecylphenyl, tetradecylphenyl, tripentylphenyl, and dodecylnaphthyl.

G represents a divalent to heptavalent linking group or a single bond, preferably a divalent to pentavalent linking group or a single bond, more preferably a divalent to tetravalent linking group or a single bond, and still more preferably a divalent to trivalent linking group or a single bond. It is preferable that G represent an alkylene group, an arylene group, or a composite group thereof. G may also represent an oxygen atom, an ester group, an amide group, a sulfonyl group, or a divalent substituted or unsubstituted linking group having a hetero atom such as sulfur. It is more preferable that G represent an oxygen atom, an ester group, or an amide group.

D represents a polyoxy alkylene group represented by "$(B)_n$-E". B represents $-CH_2CH_2O-$, $-CH_2CH_2CH_2O-$, $-CH(CH_3)CH_2O-$, or $-CH_2CH(OH)CH_2O-$ and preferably $-CH_2CH_2O-$.

n represents an integer of 1 to 50 and preferably an integer of 5 to 30.

In addition, E represents a hydrogen atom, an alkyl group having 1 to 8 carbon atoms, an aryl group, an alkylcarbonyl group having 2 to 8 carbon atoms, or an arylcarbonyl group, which may be substituted or unsubstituted.

Methyl, ethyl, propypl, butyl, hexyl, or cyclohexyl is preferable, and methyl, ethyl, or propyl is more preferable as the alkyl group having 1 to 8 carbon atoms.

A phenyl group is preferable as the aryl group.

Acetyl, propionyl, butyroyl, pivaloyl, or cyclohexanecarbonyl is preferable as the alkylcarbonyl group having 2 to 8 carbon atoms, and acetyl is more preferable.

A benzoyl group is preferable As the arylcarbonyl group.

Among the above-described compounds represented by E, a hydrogen atom, methyl, ethyl, propyl, acetyl, propionyl, or benzoyl is particularly preferable.

a and d each independently represent an integer, of 1 to 6.

When there are plural $R^1$, D, and E, the plural $R^1$, D, and E may be the same as or different from each other, respectively.

It is preferable that the dispersant represented by the formula (2) have a low solubility in an aqueous solution. For example, the solubility in water is preferably less than or equal to 0.5% by mass (at 25° C.) and more preferably less than or equal to 0.1% by mass.

Hereinafter, specific examples of the dispersant represented by the formula (2) are shown. However, the embodiment is not limited thereto.

WA-1

WA-2

WA-3

WA-4

WA-5

WA-6

WA-7

WA-8

WA-9

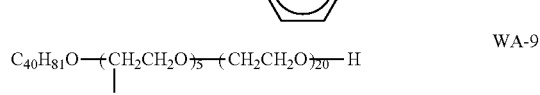

WA-10

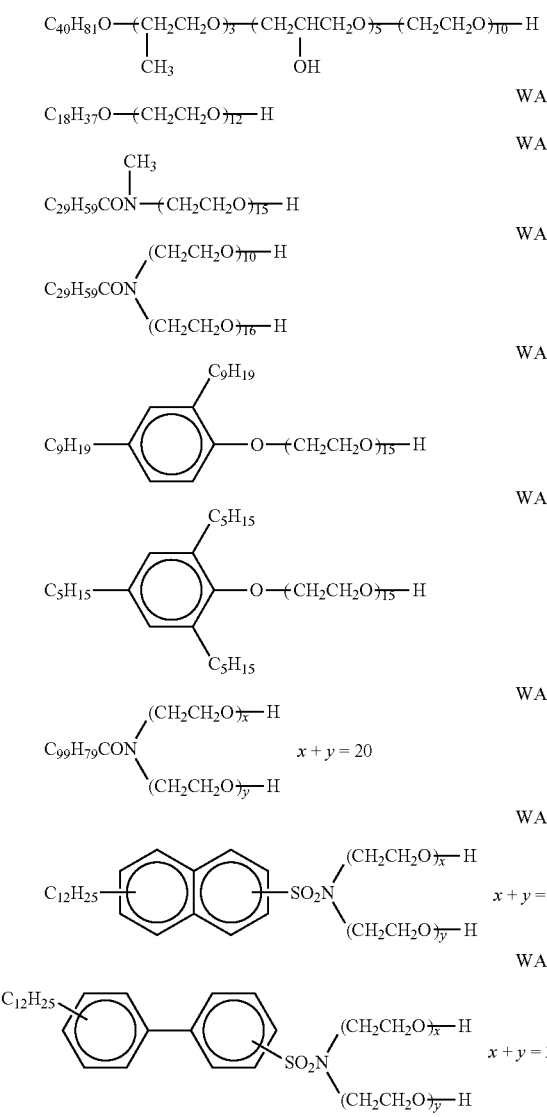

As a solvent used when the wax particles is added in the dispersion form, water is preferable. However, the solvent is not limited to water. For example, a well-known organic solvent is appropriately selected and used during dispersion. The organic solvent can be found in paragraph [0027] of JP2006-91780A. When the organic solvent is used, the stability of a lubricant dispersion is further improved. As the organic solvent, one kind may be used alone or a mixed solvent of different two or more kinds may be used.

The composition ratio of both components of wax dispersion particles obtained by using the wax particles and the dispersant represented by the formula (2) is not particularly limited, but it is preferable that the lubricant be 25% by mass to 99% by mass and the dispersant be 1% by mass to 75% by mass. When the ratio of the wax particles falls within the above-described range, the characteristics of the wax dispersion particles can be further exhibited. Therefore, it is preferable that the ratio of the dispersant represented by the formula (2) in the wax dispersion particles be smaller.

It is preferable that the wax dispersion particles be prepared by mixing the compounds with each other at a temperature, which is higher than that of a compound having the highest melting point, that is, by performing so-called melt-mixing. Likewise, an organic solvent, which is a dispersion medium, is heated at a high temperature and the above melt-mixed material is added to the organic solvent, followed by fine dispersion with various dispersion methods. It is also preferable that the heated organic solvent be added to the melt-mixed material, followed by dispersion to obtain particles. In addition, a method may also be used in which the wax particles or the dispersant is dissolved in a non-aqueous organic solvent and fine-dispersed in water using another water-soluble surfactant to be added as the wax dispersion particles. For example, as the non-aqueous organic dispersant, ethyl acetate or the like is preferable.

After the dispersion, the organic solvent is removed and the resultant is used as a wax particle dispersion (emulsified dispersion). In this case, the wax particles and the dispersant represented by the formula (2) can be melt-mixed in the organic solvent at a low temperature even when the melting points thereof are greater than or equal to 100° C. Therefore, lubricant dispersion particles having a high melting point can be prepared in an aqueous solution. The melting points of the wax particles and the dispersant represented by the formula (2) described herein are not particularly limited, but are preferably 50° C. to 200° C., more preferably 60° C. to 200° C., and still more preferably 80° C. to 150° C.

In this case, when the water-based ink is prepared, water is most preferable from the viewpoint of a small amount of environmental burden. When water is used in combination with a lubricant having a melting point of 80° C., it is preferable that the temperature of water be greater than or equal to 80° C. for dispersion.

Water-Soluble Organic Dispersant

The water-based ink according to the embodiment may contain water as a solvent and a water-soluble organic solvent. When the water-based ink contains the polymer particles and the water-soluble organic solvent, the minimum film forming temperature of the polymer particles in the water based ink can be maintained at a low level and an ink discharge property can be satisfactorily maintained.

The water solubility described herein represents 1% by mass or greater being soluble in water at 20° C.

Alkyleneoxy alcohol or alkyleneoxy alkyl ether is preferable as the water-soluble organic solvent constituting the water-based ink. When the water-based ink contains the water-soluble organic solvent, the curling of an image recorded material can be suppressed in a high-humidity environment.

Propyleneoxy alcohol is preferable As the alkyleneoxy alcohol. Examples of the propyleneoxy alcohol include SANNIX GP250 and SANNIX GP400 (manufactured by Sanyo Chemical Industries Ltd.).

Ethyleneoxy alkyl ether having 1 to 4 carbon atoms at an alkyl portion or propyleneoxy alkyl ether having 1 to 4 carbon atoms at an alkyl portion is preferable as the alkyleneoxy alkyl ether.

Examples of the alkyleneoxy alkyl ether include ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether.

In addition to the water-soluble organic solvent, the water-based ink may further include another organic solvent from the viewpoints of preventing dryness, accelerating permeation, and adjusting viscosity.

When an organic solvent is used as a dryness preventing agent and the water-based ink is discharged with an ink jet method to form an image, nozzle clogging, which may occur due to the drying of the water-based ink at an ink discharge port, can be effectively prevented. In order to prevent dryness, a water-soluble organic solvent having a steam pressure lower than that of water is preferable. Specific examples of the water-soluble organic solvent, which is preferable for preventing dryness, include polyols represented by ethylene glycol, propylene glycol, diethylene glycol, polyethylene glycol, thiodiglycol, dithiodiglycol, 2-methyl-1,3-propanediol, 1,2,6-hexanetriol, acetylenic glycol derivatives, glycerin, trimethylol propane, and the like; heterocyclic rings such as 2-pyrrolidone, N-methyl-2-pyrrolidone, 1,3-dimethyl-2-imidazoline, and N-ethylmorpholine; sulfur-containing compounds such as sulfolane, dimethyl sulfoxide, and 3-sulfolene; polyfunctional compounds such as diacetone alcohol and diethanolamine; and urea derivatives. Among these, polyols such as glycerin and diethylene glycol are preferable.

In addition, in order to accelerate permeation, an organic solvent for permeating the water-based ink into a recording substrate may be used. Specific examples of the organic solvent, which is preferable for accelerating permeation, include alcohols such as ethanol, isopropanol, butanol, and 1,2-hexanediol, sodium lauryl sulfate, sodium oleate, and nonionic surfactants.

In addition to the above-described purposes, a water-soluble organic solvent may be used in order to adjust viscosity. Specific examples of the water-soluble organic solvent, which can be used for adjusting viscosity, include alcohols (for example, methanol, ethanol, and propanol), amines (for example, ethanolamine, diethanolamine, triethanolamine, ethyleneamine, and diethyleneamine) and other polar solvents (for example, formamide, N,N-dimethylformamide, N,N-dimethylacetamide, dimethyl sulfoxide, sulfolane, 2-pyrrolidone, acetonitrile, and acetone).

Water

The water-based ink according to the embodiment contains water, and the content of water is not particularly limited. Among these, the content of water is preferably 10% by mass to 99% by mass and more preferably 20% by mass to 70% by mass with respect to the total mass of the water-based ink, from the viewpoints of securing safety and ink discharge reliability.

Surfactant

The water-based ink according to the embodiment may contain various surfactants. Among surfactants, an acetylene glycol-based surfactant is preferable. When the acetylene glycol-based surfactant is compared to the other surfactants, the surface tension and the interfacial tension with an ink jet head member (such as head nozzles) in contact with the ink can be easily maintained at an appropriate level and it is difficult for foam to be formed. Therefore, when the water-based ink is discharged, the ink discharge stability can be improved. In addition, when the water-based ink contains the acetylene glycol-based surfactant, the wettability and permeability with respect to a recording substrate are improved and the shade unevenness and bleeding of the ink are suppressed, which is advantageous for forming a fine and accurate image.

Examples of the acetylene glycol-based surfactant include SURFYNOL 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG and GA (all of which are manufactured by Air Products and Chemicals Inc.); OLFINE B, Y, P, A, STG, SPC, E1004, E1010, PD-001, PD-002W, PD-003, PD-004, EXP. 4001, EXP, 4036, EXP. 4051, AF-103, AF-104, AK-02, SK-14, and AE-3 (all of which are manufactured by Nissin Chemical Co., Ltd.); and ACETYLENOL E00, E00P, E40, and E100 (all of which are manufactured by Kawaken Fine Chemicals Co., Ltd.).

The content of the surfactant in the water-based ink is preferably 0.1% by mass to 1.5% by mass and more preferably 0.5% by mass to 1.0% by mass with respect to the total mass of the ink. When the content of the surfactant is greater than or equal to 0.1% by mass, the ink easily wets and is uniformly spread out on a fiber of a recording substrate, the scratch resistance of an image is improved, and the bleeding of an image is suppressed. As a result, a more uniform image is obtained. When the content is less than or equal to 1.5% by mass, the preservation stability and discharge stability of the water-based ink is further improved.

2-pyrrolidone

It is preferable that the water-based ink according to the embodiment contain 2-pyrrolidone. 2-pyrrolidone functions as a wetting agent. When the water-based ink contains 2-pyrrolidone, the permeability is improved and the diameter of the ink droplets (average diameter when being applied onto fiber) increases.

The content of 2-pyrrolidone in the water-based ink is preferably 0.5% by mass to 50% by mass and more preferably 0.5% by mass to 30% by mass with respect to the total mass of the ink, from the viewpoints of applying permeability to the ink to increase the diameter of the ink droplets (average diameter when being applied onto fiber). In addition, the content is still more preferably 1% by mass to 30% by mass from the viewpoint of improving an action of increasing a dot diameter and the scratch resistance of an image.

Others

Optionally, the water-based ink according to the embodiment may contain may further contain other additives in addition to the above-described components. Examples of other additives include well-known additives such as a lubricant, an anti-fading agent, an emulsion stabilizer, a permeation accelerator, an ultraviolet absorber, a preservative, an antifungal agent, a pH regulator, a surface tension regulator, a defoaming agent, a viscosity adjusting agent, a dispersant, a dispersion stabilizer, an anti-rust agent, and a chelating agent. These various additives may be directly added to the water-based ink, or may be added during the preparation of the water-based ink.

In addition to the wax particles, the water-based ink according to the embodiment may further contain a lubricant other than the wax particles. The lubricant other than the wax particles is not particularly limited as long as it has a function of reducing the coefficient of friction on a surface of an image. Examples of the lubricant include ester compounds, silicone compounds, fluorine compounds, higher aliphatic acids or salts thereof, fatty acid amide compounds (preferably, carboxylic acid amide compounds), and organic or inorganic matting agents. The details of these lubricants can be found in paragraph [0037] to [0041] of JP2010-155359A. Among these, silicone oil having a structure of "-($-Si(CH_3)_2$)$_n$-", 1-pentadecyl-2-hexadecyl-phthalic acid diester, or palmitic acid amide is preferable.

In addition, the details of the additives other than the lubricant can be found in paragraph [0098] to [0105] of JP2010-155359A.

Recording Substrate

In an image forming method according to the embodiment, a recording substrate having ink non-absorbency or low ink-absorbency is used. The recording substrate having ink non-absorbency or low ink-absorbency includes a resin sheet or film having ink non-absorbency or low ink-absorbency and an aggregate (non-woven fiber) of fiber materials having ink non-absorbency or low ink-absorbency. The recording substrate represents an image recorded material on which an image is formed.

The ink non-absorbency or low ink-absorbency represents a degree to which the recording substrate absorbs ink. The ink according to the embodiment is water-based and thus is evaluated based on water absorbency.

That is, in the embodiment, "the fiber having ink non-absorbency" represents a fiber being formed from the composition in which the water absorbency (%; 24 hours) is less than 0.2 according to ASTM D570 of an ASTM test method, and "the fiber having low ink-absorbency" represents a fiber being formed from the composition in which the water absorbency (%; 24 hours) is greater than or equal to 0.2 and less than 0.5 according to ASTM D570 of an ASTM test method.

Examples of the resin sheet or film having ink non-absorbency or low ink-absorbency include polyolefins (for example, polypropylene and polyethylene); polyesters (for example, polyethylene terephthalate, and polyethylene naphthalate); synthetic resin sheets or films such as aramid, cellulose, nylon, vinylon, and rayon; metal substrates such as stainless steel, iron, gold, silver, and aluminum substrates; and glass substrates.

Examples of the fiber materials having ink non-absorbency or low ink-absorbency include polyolefin fibers (for example, polypropylene and polyethylene fibers); polyester fibers (for example, polyethylene terephthalate and polyethylene naphthalate fibers); polymer fibers such as such as aramid fiber, cellulose fiber, nylon fiber, vinylon fiber, and rayon fiber; metal fibers such as stainless steel, iron, gold, silver, and aluminum fibers; and glass fibers (for example, glass wool).

Examples of the aggregate of the fiber materials having ink non-absorbency or low ink-absorbency include non-woven fabric, woven fabric, and glass wool.

The non-woven fabric represents a sheet-like material obtained by bonding fibers together and includes hydroentangled non-woven fabric. The non-woven fabric is a manufactured sheet, web, or batt of directionally or randomly oriented fibers, bonded by friction, cohesion, adhesion, or the like. The non-woven fabric does not include products which are woven, knitted, tufted stitch bonded incorporating binding yarns or filaments, or felted by wet milling, whether or not additionally needled.

In the embodiment, among the above-described materials, non-woven fabric is preferable and polyolefin fiber non-woven fabric is more preferable, from the viewpoints of low cost and superior workability and of revealing the effects of the embodiment more remarkably.

In the aggregate of the fiber materials according to the embodiment, the diameter (fiber diameter) of a cross-section of fiber, which constitutes the recording substrate, perpendicular to an axial direction of the fiber is preferably 1 µm to 200 µm, more preferably 1 µm to 100 µM, and still more preferably 5 µm to 60 µM. When the fiber diameter is greater than or equal to 1 µM, there are advantageous effects in terms of the scratch resistance of an image and the rigidity (stiffness) of the recording substrate. When the fiber diameter is less than or equal to 200 µM, there are advantageous effects in terms of the bleeding of an image and the texture of a recording substrate.

In addition, the thickness of the recording substrate is preferably 1 µm to 1000 µm, more preferably 1 µm to 800 µm, still more preferably 5 µm to 500 and even still more preferably 5 µm to 300 µm. When the thickness is greater than or equal to 1 µm, there are advantageous effects in terms of the scratch resistance of an image and the rigidity of the recording substrate. When the thickness is less than or equal to 1000 µm, there are advantageous effects in terms of the bleeding of an image and the texture of a recording substrate.

When the recording substrate is an aggregate of the fiber materials, the density thereof (the density of a fiber surface) is preferably 1 $g/m^2$ to 300 $g/m^2$, more preferably 1 $g/m^2$ to 200 $g/m^2$, and still more preferably 5 $g/m^2$ to 100 $g/m^2$. When the density of a fiber surface is greater than or equal to 1 $g/m^2$, there are advantageous effects from the viewpoints of easily obtaining image density. When the density of a fiber surface is less than or equal to 300 $g/m^2$, there are advantageous effects from the viewpoints of the scratch resistance of an image and the bleeding of an image.

The density of a fiber surface represents a ratio ($g/m^2$) of the amount of fibers, which are two-dimensionally arranged on a surface, to the area of the surface and is a value obtained by cutting the recording substrate into a unit area and measuring the weight thereof.

In the recording substrate, the aggregate of the fiber materials may be formed in any one of methods such as melt blowing, spunbonding, solvent spinning, electrospinning, and carding.

A pretreatment step of performing hydrophilic treatment on the recording substrate as a pretreatment, which is the previous step to the ink application step, may be provided. However, according to the embodiment, the water-based ink containing the polymer particles and the amine compound is applied onto the recording substrate. Therefore, the desired adhesion and scratch resistance of an image can be obtained without providing the pretreatment step or with a short-period of pretreatment step. Examples of the hydrophilic treatment described herein include corona treatment, plasma treatment, flame treatment, heat treatment, wear treatment, and light irradiation treatment (UV treatment).

The surface tension of the recording substrate is preferably $3.2 \times 10^{-6}$ J to $4.5 \times 10^{-6}$ J (about 32 dyn/cm to 45 dyn/cm), more preferably $3.2 \times 10^{-6}$ J to $4.0 \times 10^{-6}$ J (about 32 dyn/cm to 40 dyn/cm), and still more preferably $3.2 \times 10^{-6}$ J to $3.7 \times 10^{-6}$ J (about 32 dyn/cm to 37 dyn/cm). When the surface tension of the recording substrate is greater than or equal to the lower limit, the adhesion of an image is further improved. When the surface tension of the recording substrate is less than or equal to the upper limit, the texture of the recording substrate can be satisfactorily maintained.

The surface tension of the recording substrate can be measured using a wetting tension test mixture (manufactured by Wako Pure Chemical Industries Ltd.), and the number of a wetting tension mixture which wets the recording substrate can be set as a surface tension of the recording substrate.

In this case, the surface tension of the water-based ink is preferably 20 mN/m to 40 mN/m (=dyn/cm) and more preferably 30 mN/m to 40 mN/m (=dyn/cm). The surface tension of the water-based ink is measured using a static surface tensiometer (TD3 manufactured by Ikeda Scientific Co., Ltd.) according to a Wilhelmy method.

Drying and Fixing Step

According to the embodiment, it is preferable that, during and/or after applying the water-based ink onto the recording substrate in the ink application step, a drying and fixing step of drying the water-based ink applied onto the recording substrate to fix the water-based ink on the recording substrate be further provided. That is, it is preferable that an image recorded material, which is obtained with the image forming method according to the embodiment, have an ink image formed thereon through the drying treatment.

Through the drying and fixing step, the evaporation of liquid media (specifically, water and the water-soluble organic solvent) in the water-based ink is accelerated. As a result, a high-quality image which has little image unevenness and bleeding; and an image recorded material having superior scratch resistance can be obtained in a short period of time. In addition, the wrinkling of the recording substrate can be prevented, and further the curling of the recording substrate can be also prevented. In addition, during drying, heating accelerates for the polymer particles to coalesce. As a result, a superior coating film is formed and the scratch resistance of an image recorded material is further improved.

During drying, the drying temperature is not particularly limited within a range that can evaporate the liquid media in the water-based ink and can form a coating film from the polymer particles, and is preferably greater than or equal to 40° C. from the above-described viewpoints. Among these, the drying temperature is preferably 40° C. to 150° C. and more preferably 40° C. to 80° C. When the temperature is less than or equal to 80° C., the recording substrate can be prevented from being deformed.

During drying, the heating time is not particularly limited within a range that can evaporate the liquid media in the water-based ink and can form a coating film from the polymer particles, and can be appropriately selected in consideration of the kind of the liquid media, the kind of the polymer particles, the recording rate, and the like.

A drying method is not particularly limited as long as it accelerates the evaporation of the liquid media in the water-based ink. Examples of the drying method include a method of applying heat to the recording substrate before and after recording, a method of blowing the wind toward the recording substrate after recording, and a combination method thereof. Specific examples thereof include forced-air heating, radiation heating, conduction heating, high-frequency drying, microwave drying, and dry air blowing.

Image Recorded Material

An image recorded material according to the embodiment includes a recording substrate having ink non-absorbency or low ink-absorbency; and an ink image which is formed on the recording substrate and contains a polymer, an amine compound having at least one hydroxyl group, and a colorant. When the image recorded material according to the embodiment contains the polymer and the amine compound, the adhesion with the recording substrate having ink non-absorbency or low ink-absorbency is improved as described above and superior scratch resistance is exhibited.

The details of the recording substrate having ink non-absorbency or low ink-absorbency; and the details of the amine compound, the colorant, and the like which form the ink image are the same as described above. In addition, the polymer is the same as the polymer constituting the above-described polymer particles. The ink image may contain the polymer in the form of the polymer particles or in the different form from particles by applying heat in the drying and fixing step.

In the image recorded material according to the embodiment, any methods, in which the ink image containing the above-described components can be formed on the recording substrate having ink non-absorbency or low ink-absorbency, may be used. In the embodiment, the image recorded material, which is obtained with the above-described image forming method according to the embodiment, is preferable from the viewpoints of improving the adhesion and scratch resistance of an image with the ink image.

The thickness of the ink image is not particularly limited, and is preferably 0.1 μm to 10.0 μm. When the thickness falls within the above-described range, there are advantageous effects from the viewpoints of scratch resistance, adhesion, and the texture of an image.

EXAMPLES

Hereinafter, the embodiment will be described in detail with reference to examples, but the embodiment is not limited to the following examples within the range not departing from the concepts of the embodiment. "Part" represents "part by mass" unless specified otherwise.

The weight average molecular weight is measured using gel permeation chromatography (GPC). HLC-8220GPC (manufactured by Tosoh Corporation) is used as GPC equipment and TSKgeL Super HZM-H, TSKgeL Super HZ4000, and TSKgeL Super HZ2000 (manufactured by Tosoh Corporation, 4.6 mmID×15 cm) are used as columns. The details of GPC are the same as the conditions described in paragraph [0076] of JP2010-155359A.

Example 1

Preparation of Magenta Ink
Synthesis of Polymeric Dispersant P-1
Based on the following scheme, a polymer dispersant P-1 is synthesized as follows.

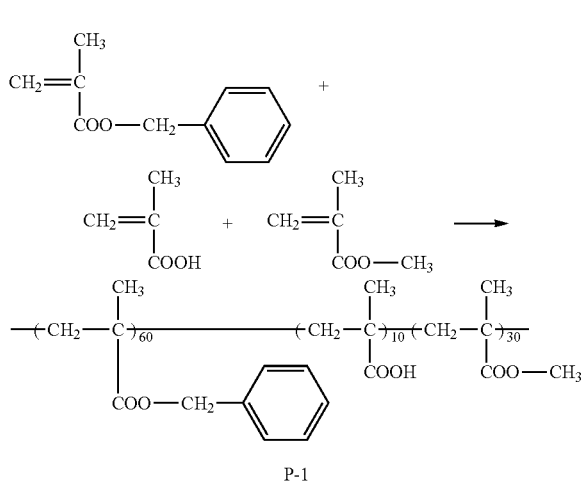

P-1

To a 1000 ml three-necked flask which is equipped with a stirrer and a condenser, 88 g of methyl ethyl ketone was added, followed by heating in a nitrogen atmosphere at 72° C. A solution, obtained by dissolving 0.85 g of dimethyl-2,2'-azobisisobutyrate, 60 g of benzyl methacrylate, 10 g of methacrylic acid, and 30 g of methyl methacrylate in 50 g of methyl ethyl ketone, was added dropwise thereto for 3 hours. After the dropwise addition, a reaction was continued for 1 hour. A solution, obtained by dissolving 0.42 g of dimethyl-2,2'-azobisisobutyrate in 2 g of methyl ethyl ketone, was added to the resultant, followed by heating at 78° C. for 4 hours. The obtained reaction solution was reprecipitated twice with an excess quantity of hexane. The precipitated resin was dried. As a result, 96 g of the polymer dispersant P-1 was obtained.

The composition of the obtained polymer dispersant P-1 was examined by $^1$H-NMR. The weight average molecular weight (Mw) measured using GPC was 44,600. Furthermore, the acid value was 65.2 mgKOH/g when measured with a method according to JIS standard (JIS K0070: 1992).

Preparation of Magenta Pigment Dispersion

Ten (10) parts of Pigment Red 122 (CROMOPHTAL Jet Magenta DMQ, manufactured by Ciba Specialty Chemicals Inc.; magenta pigment), 5 parts of the polymer dispersant P-1, 42 parts of methyl ethyl ketone, 5.5 parts of 1N NaOH aqueous solution, and 87.2 parts of ion exchange water were mixed, followed by dispersion for 2 to 6 hours using a bead mill with 0.1 mmφ zirconia beads.

Methyl ethyl ketone was removed from the obtained dispersion at 55° C. under reduced pressure and a part of the water was further removed, followed by centrifugal treatment for 30 minutes at 8000 rpm using a high-speed refrigerated centrifuge 7550 (manufactured by Kubota Corporation) with a 50 mL centrifuge tube. At this time, a supernatant liquid other than precipitates was collected. Then, the concentration of the pigment was obtained from the absorption spectrum of this supernatant liquid. A dispersion (magenta pigment dispersion) of resin-coated pigment particles (pigment coated with the polymeric dispersant) having a concentration of the pigment of 15% by mass was obtained.

Preparation of Magenta Ink

Components of the following composition were mixed with each other and the mixed solution was poured into a disposable syringe made of plastic, followed by filtration through a filter (Millex-SV manufactured by Millipore Corporation, diameter: 25 mm) which is made of polyvinylidene fluoride (PVDF) and has a pore diameter of 5 μm. As a result, a water-based magenta ink A was obtained.

Composition a of Water-Based Ink A

| | |
|---|---|
| Magenta Pigment Dispersion (Pigment Concentration: 15% by mass) | 26.7 parts by mass |
| 2-pyrrolidone (manufactured by Tokyo Chemical Industry Co., Ltd.) | 17 parts by mass |
| 2-methyl-1,3-propanediol | 9 parts by mass |
| OLFIN E1010 (manufactured by Nissin Chemical Co., Ltd.) | 1 part by mass |
| ACRIT WBR-016U (manufactured by Taisei Fine Chemical Co., Ltd., dispersion of 30% by mass of polyurethane resin particles (Tg: 20° C., volume average particle size: about 30 nm)) | 16.7 parts by mass |
| Triethanolamine (manufactured by Tokyo Chemical Industry Co., Ltd.) | 1 part by mass |
| Ion exchange water | Balance (part by mass) when the total amount of the ink is 100 parts by mass |

Image Formation and Evaluation

1. Image Formation

Corona treatment was performed twice on polypropylene non-woven fabric (density of fiber surface: 30 g/m$^2$, thickness: 13 μm, fiber diameter: 20 μm; hereinafter, referred to as "PP non-woven fabric") using a CORONA MASTER (manufactured by Shinko Electric & Instrumentation Co., Ltd., PS-10S) under conditions of a treatment voltage of 10 kV and a treatment speed of 50 mm/sec. 85 pL of the water-based ink A prepared as described above was discharged from a printer device GELJET GX-5000 (manufactured by Ricoh Company, Ltd.), of which a printer head is replaced with a Q-class head (manufactured by FUJIFILM Dimatix Inc.), to form 100% solid images at 200 dpi (ink application step) on the non-woven fabric subjected to corona treatment. Each of these solid images was brought into close contact with a nylon mesh plate and warm air was blown toward an image-non-forming surface of the polypropylene non-woven fabric with a drier for 30 seconds under conditions of a wind speed of 7 m/s and a temperature of 40° C. to be dried and fixed (drying and fixing step). In this way, image samples were obtained.

2. Measurement and Evaluation

The image samples obtained as described above were measured and evaluated as follows. The results of the measurements and the evaluations are shown in Table 1 below.

A. Scratch Resistance

For image portions of the obtained image samples, the scratch resistance test was performed with a Color Fastness Rubbing Tester (manufactured by Yasuda Seiki Seisakusho Ltd., No. 428) by rubbing back and forth the image portions a predetermined number of times with white cotton at a force of 2N. The scratch resistance was evaluated based on the following evaluation criteria by visually inspecting a color transferred onto the white cotton. "A to C" among the evaluation criteria represents that the scratch resistance is in an allowable range.

Evaluation Criteria

A: Even when the image portion was rubbed back and forth with the white cotton 10 times, almost no color transfer was observed on the white cotton and there were no problem in practice B: When the image portion was rubbed back and forth with the white cotton 10 times, color transfer was observed on the white cotton to a small degree and there were no problems in practice C: When the image portion was rubbed back and forth with the white cotton 10 times, color transfer was observed on the white cotton; however, when the image portion was rubbed back and forth with the white cotton 3 times, almost no color transfer was observed, and there were no problems in practice D: When the image portion was rubbed back and forth with the white cotton 3 times, color transfer was observed on the white cotton and there were problems in practice E: When the image portion was rubbed back and forth with the white cotton 3 times, color transfer was clearly observed on the white cotton B. Adhesion For the image portions of the obtained image samples, the peeling test was performed using a tape. At this time, whether or not an image is peeled off from a recording substrate was determined by observing the tape with a loupe and the evaluation was performed based on the following evaluation criteria. At this time, even when the recording substrate is peeled off, that is, even when fiber with applied ink was attached onto the tape after the peeling test, it was determined that the ink was not peeled off unless the peel-off of the ink was observed. "A and B" among the evaluation criteria represents that the adhesion is in an allowable range.

Evaluation Criteria

A: Even when the peeling test was performed using a packing tape, the peeled ink was not observed on the tape B: When the peeling test was performed using a packing tape, the peeled ink was observed on the tape to a small degree; however, when the peeling test was performed using a cellophane tape, the peeled ink was not observed on the tape C: When the peeling test was performed using a cellophane tape, the peeled ink was observed on the tape to a small degree; however, when the peeling test was performed using a mending tape, the peeled ink was not observed on the tape D: When the peeling test was performed using a mending tape, the peeled ink was observed on the tape In this case, KRAFT TAPE 0523 (manufactured by ASKUL Corporation) was used as the packing tape; CELLO-TAPE No. 405 (manufactured by Nichiban Co., Ltd.) was used as the cellophane tape; and SCOTCH MENDING TAPE 810 (manufactured by 3M Corporation) was used as the mending tape.

Comparative Example 1

A magenta ink was prepared in the same method as that of Example 1, except that the following composition b was used instead of the composition a of the water-based ink A. Then, images were formed therewith and the evaluations were performed.

Composition b of Water-Based Ink B

| | |
|---|---|
| Magenta Pigment Dispersion (Pigment Concentration: 15% by mass) | 26.7 parts by mass |
| 2-pyrrolidone (manufactured by Tokyo Chemical Industry Co., Ltd.) | 17 parts by mass |
| 2-methyl-1,3-propanediol | 9 parts by mass |
| OLFIN E1010 (manufactured by Nissin Chemical Co., Ltd.) | 1 part by mass |
| JONCRYL 741 (manufactured by Johnson Polymer Ltd.; dispersion of 49% by mass of styrene/acrylic resin particles (Tg: 15° C., volume average particle size: about 84 nm)) | 10.2 parts by mass |
| Ion exchange water | Balance (part by mass) when the total amount of the ink is 100 parts by mass |

Example 2

A magenta ink was prepared in the same method as that of Example 1, except that the following composition c was used instead of the composition a of the water-based ink A. Then, images were formed therewith and the evaluations were performed.

Composition c of Water-Based Ink C

| | |
|---|---|
| Magenta Pigment Dispersion (Pigment Concentration: 15% by mass) | 26.7 parts by mass |
| 2-pyrrolidone (manufactured by Tokyo Chemical Industry Co., Ltd.) | 17 parts by mass |
| 2-methyl-1,3-propanediol | 9 parts by mass |
| OLFIN E1010 (manufactured by Nissin Chemical Co., Ltd.) | 1 part by mass |
| ACRIT WBR-016U (manufactured by Taisei Fine Chemical Co., Ltd., dispersion of 30% by mass of polyurethane resin particles (Tg: 20° C., volume average particle size: about 30 nm)) | 16.7 parts by mass |
| SELOZOL 524 (manufactured by Chukyo Yushi Co., Ltd.; dispersion of 30% by mass of carnauba wax particles (Tm: 83° C., volume average particle size: about 80 nm)) | 6.7 parts by mass |
| Triethanolamine (manufactured by Tokyo Chemical Industry Co., Ltd.) | 2 parts by mass |
| Ion exchange water | Balance (part by mass) when the total amount of the ink is 100 parts by mass |

Comparative Example 2

A magenta ink was prepared in the same method as that of Example 1, except that the following composition d was used instead of the composition a of the water-based ink A. Then, images were formed therewith and the evaluations were performed.

Composition d of Water-Based Ink D

| | |
|---|---|
| Magenta Pigment Dispersion (Pigment Concentration: 15% by mass) | 26.7 parts by mass |
| 2-pyrrolidone (manufactured by Tokyo Chemical Industry Co., Ltd.) | 17 parts by mass |
| 2-methyl-1,3-propanediol | 9 parts by mass |
| OLFIN E1010 (manufactured by Nissin Chemical Co., Ltd.) | 1 part by mass |
| JONCRYL 741 (manufactured by Johnson Polymer Ltd.; dispersion of 49% by mass of styrene/acrylic resin particles (Tg: 15° C., volume average particle size: about 84 nm)) | 10.2 parts by mass |
| POLYRON O-255 (manufactured by Chukyo Yushi Co., Ltd.; dispersion of 30% by mass of polyethylene wax particles (Tm: 138° C., volume average particle size: about 73 nm)) | 6.7 parts by mass |
| Ion exchange water | Balance (part by mass) when the total amount of the ink is 100 parts by mass |

Example 3

A magenta ink was prepared in the same method as that of Example 1, except that the following composition e was used instead of the composition a of the water-based ink A. Then, images were formed therewith and the evaluations were performed.

Composition e of Water-Based Ink E

| | |
|---|---|
| Magenta Pigment Dispersion (Pigment Concentration: 15% by mass) | 26.7 parts by mass |
| 2-pyrrolidone (manufactured by Tokyo Chemical Industry Co., Ltd.) | 17 parts by mass |
| 2-methyl-1,3-propanediol | 9 parts by mass |
| OLFIN E1010 (manufactured by Nissin Chemical Co., Ltd.) | 1 part by mass |
| ACRIT WBR-016U (manufactured by Taisei Fine Chemical Co., Ltd., dispersion of 30% by mass of polyurethane resin particles (Tg: 20° C., volume average particle size: about 30 nm)) | 16.7 parts by mass |
| SELOZOL 524 (manufactured by Chukyo Yushi Co., Ltd.; dispersion of 30% by mass of carnauba wax particles (Tm: 83° C., volume average particle size: about 80 nm)) | 6.7 parts by mass |
| N,N-diethylethanolamine (manufactured by Tokyo Chemical Industry Co., Ltd.) | 1 part by mass |
| Ion exchange water | Balance (part by mass) when the total amount of the ink is 100 parts by mass |

Example 4

A magenta ink was prepared in the same method as that of Example 1, except that the following composition f was used instead of the composition a of the water-based ink A. Then, images were formed therewith and the evaluations were performed.

Composition f of Water-Based Ink F

| | |
|---|---|
| Magenta Pigment Dispersion (Pigment Concentration: 15% by mass) | 26.7 parts by mass |
| 2-pyrrolidone (manufactured by Tokyo Chemical Industry Co., Ltd.) | 17 parts by mass |
| 2-methyl-1,3-propanediol | 9 parts by mass |
| OLFIN E1010 (manufactured by Nissin Chemical Co., Ltd.) | 1 part by mass |
| ACRIT WBR-016U (manufactured by Taisei Fine Chemical Co., Ltd., dispersion of 30% by mass of polyurethane resin particles (Tg: 20° C., volume average particle size: about 30 nm)) | 16.7 parts by mass |
| SELOZOL 524 (manufactured by Chukyo Yushi Co., Ltd.; dispersion of 30% by mass of carnauba wax particles (Tm: 83° C., volume average particle size: about 80 nm)) | 6.7 parts by mass |
| Bis(2-hydroxyethyl)amino-tris(hydroxymethyl)methane (manufactured by Tokyo Chemical Industry Co., Ltd.) | 2 parts by mass |
| Ion exchange water | Balance (part by mass) when the total amount of the ink is 100 parts by mass |

Comparative Example 3

A magenta ink was prepared in the same method as that of Example 1, except that the following composition g was used instead of the composition a of the water-based ink A. Then, images were formed therewith and the evaluations were performed.

Composition g of Water-Based Ink G

| | |
|---|---|
| Magenta Pigment Dispersion (Pigment Concentration: 15% by mass) | 26.7 parts by mass |
| 2-pyrrolidone (manufactured by Tokyo Chemical Industry Co., Ltd.) | 17 parts by mass |
| 2-methyl-1,3-propanediol | 9 parts by mass |
| OLFIN E1010 (manufactured by Nissin Chemical Co., Ltd.) | 1 part by mass |
| ACRIT WBR-016U (manufactured by Taisei Fine Chemical Co., Ltd., dispersion of 30% by mass of polyurethane resin particles (Tg: 20° C., volume average particle size: about 30 nm)) | 16.7 parts by mass |
| Ion exchange water | Balance (part by mass) when the total amount of the ink is 100 parts by mass |

Comparative Example 4

A magenta ink was prepared in the same method as that of Example 1, except that the following composition h was used instead of the composition a of the water-based ink A. Then, images were formed therewith and the evaluations were performed.

Composition h of Water-Based Ink H

| | |
|---|---|
| Magenta Pigment Dispersion (Pigment Concentration: 15% by mass) | 26.7 parts by mass |
| 2-pyrrolidone (manufactured by Tokyo Chemical Industry Co., Ltd.) | 17 parts by mass |
| 2-methyl-1,3-propanediol | 9 parts by mass |
| OLFIN E1010 (manufactured by Nissin Chemical Co., Ltd.) | 1 part by mass |
| ACRIT WBR-016U (manufactured by Taisei Fine Chemical Co., Ltd., dispersion of 30% by mass of polyurethane resin particles (Tg: 20° C., volume average particle size: about 30 nm)) | 16.7 parts by mass |
| Glycerin (manufactured by Tokyo Chemical Industry Co., Ltd.) | 1 part by mass |
| Ion exchange water | Balance (part by mass) when the total amount of the ink is 100 parts by mass |

Example 5

Images were formed and the evaluations were performed in the same method as that of Example 1, except that the recording substrate is changed to a polypropylene sheet (manufactured by Sekisui Seikei Co., Ltd., POLYSAME, P-8134, color: natural; hereinafter, referred to as "PP sheet").

Example 6

Images were formed and the evaluations were performed in the same method as that of Example 1, except that 10 pL of the magenta ink was discharged using a MATERIAL PRINTER (manufactured by FUJIFILM Dimatix Inc., DMP-3000).

Example 7

Images were formed and the evaluations were performed in the same method as that of Example 1, except that 40 pL of the magenta ink was discharged using a MATERIAL PRINTER (manufactured by FUJIFILM Dimatix Inc., DMP-3000).

Example 8

Images were formed and the evaluations were performed in the same method as that of Example 1, except that 60 pL of the magenta ink was discharged using a MATERIAL PRINTER (manufactured by FUJIFILM Dimatix Inc., DMP-3000).

Example 9

Images were formed and the evaluations were performed in the same method as that of Example 1, except that 120 pL of the magenta ink was discharged using a MATERIAL PRINTER (manufactured by FUJIFILM Dimatix Inc., DMP-3000).

Example 10

Images were formed and the evaluations were performed in the same method as that of Example 1, except that 150 pL of the magenta ink was discharged using a MATERIAL PRINTER (manufactured by FUJIFILM Dimatix Inc., DMP-3000).

Example 11

A water-based-ink I (composition i) as a magenta ink was prepared in the same method as that of Example 1, except that 10.87 parts by mass of dispersion of 45% by mass of styrene/acrylic resin particles (JONCRYL 538, manufactured by Johnson Polymer Ltd.; Tg: 66° C., volume average particle size: about 90 nm) was used instead of 16.7 parts by mass of polyurethane resin particles (ACRIT WBR-016U) in the composition a of the water-based ink A. Then, images were formed therewith and the evaluations were performed.

TABLE 1

| | Polymer Particles | Wax Particles | Compound Having Hydroxyl Group (Amine Compound) Kind | Number of OH | Recording Substrate | Amount of Ink Droplets [pl] | Image Recorded Material Scratch Resistance | Adhesion |
|---|---|---|---|---|---|---|---|---|
| Example 1 | Polyurethane | — | Triethanolamine | 3 | PP Non-Woven Fabric | 85 | B | A |
| Comparative Example 1 | Styrene/Acryl | — | — | | PP Non-Woven Fabric | 85 | E | D |
| Example 2 | Polyurethane | Carnauba | Triethanolamine | 3 | PP Non-Woven Fabric | 85 | A | A |
| Comparative Example 2 | Styrene/Acryl | Polyethylene | — | | PP Non-Woven Fabric | 85 | D | C |
| Example 3 | Polyurethane | carnauba | N,N-diethylethanolamine | 1 | PP Non-Woven Fabric | 85 | B | B |
| Example 4 | Polyurethane | carnauba | Bis(2-hydroxyethyl)amino-tris(hydroxymethyl)methane | 5 | PP Non-Woven Fabric | 85 | A | A |
| Comparative Example 3 | Polyurethane | — | — | | PP Non-Woven Fabric | 85 | C | C |
| Comparative Example 4 | Polyurethane | — | Glycerin | 3 | PP Non-Woven Fabric | 85 | E | D |
| Example 5 | Polyurethane | — | Triethanolamine | 3 | PP Sheet | 85 | A | A |
| Example 6 | Polyurethane | — | Triethanolamine | 3 | PP Non-Woven Fabric | 10 | C | B |
| Example 7 | Polyurethane | — | Triethanolamine | 3 | PP Non-Woven Fabric | 40 | B | B |
| Example 8 | Polyurethane | — | Triethanolamine | 3 | PP Non-Woven Fabric | 60 | B | A |
| Example 9 | Polyurethane | — | Triethanolamine | 3 | PP Non-Woven Fabric | 120 | B | A |
| Example 10 | Polyurethane | — | Triethanolamine | 3 | PP Non-Woven Fabric | 150 | C | B |
| Example 11 | Styrene/Acryl | — | Triethanolamine | 3 | PP Non-Woven Fabric | 85 | C | B |

*.PP: Polypropylene

In each of the examples, the surface tensions of the non-woven fabric and the sheet, the surface tension of the water-based ink, and the diameter of the ink droplets (diameter before being applied) are shown in Table 2 below. The diameter of the ink droplets described herein was measured by directly observing the ink droplets using a high-speed camera Hyper Vision HPV-2A (manufactured by Shimadzu Corporation).

TABLE 2

| Recording Substrate | |
|---|---|
| Kind | Surface Tension (dyn/cm) |
| PP Non-Woven Fabric | 35 to 37 |
| PP Sheet | 35 to 37 |

| Ink | | | |
|---|---|---|---|
| | Surface Tension (dyn/cm) | Diameter of Ink Droplets*[1] (μm) | Composition |
| Example 1 | 37.7 | 54 | a |
| Comparative Example 1 | 37.6 | 54 | b |
| Example 2 | 37.9 | 55 | c |
| Comparative Example 2 | 37.5 | 53 | d |
| Example 3 | 37.8 | 55 | e |
| Example 4 | 37.5 | 55 | f |
| Comparative Example 3 | 37.5 | 54 | g |
| Comparative Example 4 | 37.7 | 54 | h |
| Example 11 | 35.7 | 55 | i |

*[1]Diameter Before Being Applied

As shown in Table 1, since the ink images in the Examples contain the polymer particles and the amine compound having an amine structure and a hydroxyl group, the scratch resistance of images, which were formed using the recording substrates having ink non-absorbency or low ink-absorbency, was superior and the adhesion was superior to those of the Comparative Examples.

On the other hand, since the specific amine compound was not used in the Comparative Examples, the expected adhesion was not obtained and the scratch resistance deteriorated. In particular, in the system using glycerin (Comparative Example 4) which has a hydroxyl group and does not have a nitrogen atom, the scratch resistance and the adhesion significantly deteriorated.

The embodiment can be used for an application of forming an image on a recording substrate having ink non-absorbency or low ink-absorbency. For example, the embodiment is desirable for use in using non-woven fabric as a recording substrate having ink non-absorbency or low ink-absorbency (for example, diapers (including disposable underwear), training pants, or medical products such as adult diapers for urinary incontinence).

"The diapers" described herein represents absorbent products which are generally worn around the lower body of a baby or a patient with urinary incontinence so as to surround the waist and legs, and contain urine, defecation, and the like.

This application claims priority under 35 U.S.C. §119 of Japanese Patent application JP 2012-010511, filed on Jan. 20, 2012 and Japanese Patent application JP 2012-244424, filed on Nov. 6, 2012, the entire contents of which are hereby incorporated by reference.

What is claimed is:

1. An image forming method comprising:
   an ink application step of applying a water-based ink containing polymer particles, an amine compound having at least one hydroxyl group, a colorant, and water, onto an aggregate of fiber materials having ink non-absorbency or low ink-absorbency,
   wherein during the application, the water-based ink is applied onto the aggregate of fiber materials with an ink jet method with an amount of ink droplets of 60 pl to 120 pl, and
   wherein the polymer particles are particles containing polyurethane.

2. The image forming method according to claim 1, wherein the amine compound is a compound represented by the following formula (1),

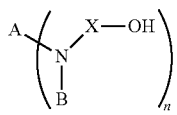
Formula (1)

wherein in the formula, X represents an alkylene group having 1 to 10 carbon atoms or an alkyleneoxy alkylene group having 1 to 10 carbon atoms; n represents 1 or 2; when n=1, A and B each independently represent a hydrogen atom or an alkyl group and B and A or B and X may be bonded and linked to each other; and when n=2, A represents an alkylene group or an alkylamine group, B represents a hydrogen atom or an alkyl group, and B and X may be bonded and linked to each other.

3. The image forming method according to claim 1, wherein the number of hydroxyl groups in the amine compound is 1 to 10.

4. The image forming method according to claim 2, wherein the number of hydroxyl groups in the amine compound is 1 to 10.

5. The image forming method according to claim 1, wherein the water-based ink further contains wax particles.

6. The image forming method according to claim 4, wherein the water-based ink further contains wax particles.

7. The image forming method according to claim 1, wherein the colorant is a pigment, and the water-based ink further contains a dispersant which disperses the pigment.

8. The image forming method according to claim 1, wherein the fiber materials are polymer fibers.

9. The image forming method according to claim 1, further comprising:
   a drying and fixing step of drying the water-based ink being applied in the ink application step to fix the water-based ink on the recording substrate.

10. An image recorded material comprising:
    an aggregate of fiber materials having ink non-absorbency or low ink-absorbency; and
    an ink image which is formed on the aggregate of fiber materials and contains a polymer, an amine compound having at least one hydroxyl group, and a colorant,
    wherein ink is applied onto the aggregate of fiber materials with an ink jet method with an amount of ink droplets of 60 pl to 120 pl, and
    wherein the polymer contains polyurethane.

11. The image forming method according to claim 1, wherein the fiber materials are polyolefin fibers.

* * * * *